United States Patent
Milobar

(10) Patent No.: US 12,394,817 B2
(45) Date of Patent: Aug. 19, 2025

(54) METHODS, SYSTEMS, AND DEVICES FOR APPLYING FORCES TO ELECTROCHEMICAL DEVICES

(71) Applicant: Sion Power Corporation, Tucson, AZ (US)

(72) Inventor: Daniel G. Milobar, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 731 days.

(21) Appl. No.: 17/621,409

(22) PCT Filed: Jun. 18, 2020

(86) PCT No.: PCT/US2020/038375
§ 371 (c)(1),
(2) Date: Dec. 21, 2021

(87) PCT Pub. No.: WO2020/257414
PCT Pub. Date: Dec. 24, 2020

(65) Prior Publication Data
US 2022/0359902 A1   Nov. 10, 2022

Related U.S. Application Data

(60) Provisional application No. 62/864,831, filed on Jun. 21, 2019.

(51) Int. Cl.
*H01M 10/04* (2006.01)
*H01M 10/052* (2010.01)
(Continued)

(52) U.S. Cl.
CPC ..... *H01M 10/0481* (2013.01); *H01M 10/052* (2013.01); *H01M 10/44* (2013.01); *H01M 50/119* (2021.01); *H01M 50/159* (2021.01)

(58) Field of Classification Search
None
See application file for complete search history.

(56) References Cited

U.S. PATENT DOCUMENTS

| | | | |
|---|---|---|---|
| 1,956,243 A | 4/1934 | McEachron et al. | |
| 4,063,005 A | 12/1977 | Mamantov et al. | |

(Continued)

FOREIGN PATENT DOCUMENTS

| | | |
|---|---|---|
| CA | 2332452 A1 | 11/1999 |
| CA | 2532270 A1 | 11/1999 |

(Continued)

OTHER PUBLICATIONS

Office Action for JP Application No. 2021-576067 dated Aug. 20, 2024.

(Continued)

*Primary Examiner* — Carlos Barcena
(74) *Attorney, Agent, or Firm* — Wolf, Greenfield & Sacks, P.C.

(57) ABSTRACT

Methods, systems, and devices for applying forces to electrochemical devices are generally described. In some cases, the methods include applying a force to an electrochemical device via a solid surface that, in the absence of an applied force, has at least a portion that is convex with respect to a side of the electrochemical device. Certain embodiments are related to systems and devices for applying a force to an electrochemical cell, with some of the systems and devices employing, for example, solid articles with certain shapes (e.g., convex shapes in the absence of an applied force) and/or inventive couplings.

23 Claims, 14 Drawing Sheets

(51) Int. Cl.
  *H01M 10/44* (2006.01)
  *H01M 50/119* (2021.01)
  *H01M 50/159* (2021.01)

(56) References Cited

U.S. PATENT DOCUMENTS

| | | | |
|---|---|---|---|
| 4,384,029 A | 5/1983 | Kordesch et al. |
| 4,410,609 A | 10/1983 | Peled et al. |
| 4,477,545 A | 10/1984 | Akridge et al. |
| 4,664,991 A | 5/1987 | Perichaud et al. |
| 4,683,178 A | 7/1987 | Stadnick et al. |
| 4,739,018 A | 4/1988 | Armand et al. |
| 4,833,048 A | 5/1989 | Dejonghe et al. |
| 4,917,974 A | 4/1990 | De Jonghe et al. |
| 4,935,317 A | 6/1990 | Fauteux et al. |
| 5,090,296 A | 2/1992 | Todd |
| 5,114,804 A | 5/1992 | Stiles et al. |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,472,808 A | 12/1995 | Peled et al. |
| 5,510,209 A | 4/1996 | Abraham et al. |
| 5,514,155 A | 5/1996 | Daneshvar |
| 5,516,598 A | 5/1996 | Visco et al. |
| 5,529,860 A | 6/1996 | Skotheim et al. |
| 5,582,623 A | 12/1996 | Chu |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,800,939 A | 9/1998 | Mishina et al. |
| 5,834,135 A | 11/1998 | Pendalwar et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,030,720 A | 2/2000 | Chu et al. |
| 6,117,583 A | 9/2000 | Nilsson et al. |
| 6,117,590 A | 9/2000 | Skotheim et al. |
| 6,120,930 A | 9/2000 | Rouillard et al. |
| 6,143,216 A | 11/2000 | Loch et al. |
| 6,143,446 A | 11/2000 | Davis et al. |
| 6,153,337 A | 11/2000 | Carlson et al. |
| 6,165,645 A | 12/2000 | Nishimura et al. |
| 6,201,100 B1 | 3/2001 | Gorkovenko et al. |
| 6,203,947 B1 | 3/2001 | Peled et al. |
| 6,238,819 B1 | 5/2001 | Cahill et al. |
| 6,238,821 B1 | 5/2001 | Mukherjee et al. |
| 6,245,455 B1 | 6/2001 | Kohno et al. |
| 6,268,087 B1 | 7/2001 | Kim et al. |
| 6,306,545 B1 | 10/2001 | Carlson et al. |
| 6,365,032 B1 | 4/2002 | Shiepe et al. |
| 6,391,069 B1 | 5/2002 | Gozdz et al. |
| 6,413,667 B1 | 7/2002 | Gozdz |
| 6,468,692 B1 | 10/2002 | Nemoto et al. |
| 6,558,438 B1 | 5/2003 | Satoh et al. |
| 6,585,869 B2 | 7/2003 | Shiepe et al. |
| 6,664,006 B1 | 12/2003 | Munshi |
| 6,682,853 B2 | 1/2004 | Kimijima et al. |
| 6,689,177 B2 | 2/2004 | Sugiyama et al. |
| 6,733,924 B1 | 5/2004 | Skotheim et al. |
| 6,797,428 B1 | 9/2004 | Skotheim et al. |
| 6,806,001 B1 | 10/2004 | Benczur-Uermoessy et al. |
| 6,819,082 B2 | 11/2004 | Yang |
| 6,844,110 B2 | 1/2005 | Enomoto et al. |
| 6,936,381 B2 | 8/2005 | Skotheim et al. |
| 6,951,699 B2 | 10/2005 | Yata et al. |
| 7,087,344 B2 | 8/2006 | Kaneta |
| 7,235,330 B1 | 6/2007 | Fujimoto et al. |
| 7,244,530 B2 | 7/2007 | Hambitzer et al. |
| 7,247,408 B2 | 7/2007 | Skotheim et al. |
| 7,252,689 B2 | 8/2007 | Fujino et al. |
| 7,354,675 B2 | 4/2008 | Molter |
| 7,642,001 B2 | 1/2010 | Yata et al. |
| 7,688,075 B2 | 3/2010 | Kelley et al. |
| 7,691,530 B2 | 4/2010 | Kim et al. |
| 7,736,800 B2 | 6/2010 | Lee |
| 7,749,655 B2 | 7/2010 | Doh et al. |
| 7,771,870 B2 | 8/2010 | Affinito et al. |
| 7,785,730 B2 | 8/2010 | Affinito et al. |
| 7,842,418 B2 | 11/2010 | Miyahisa et al. |
| 7,939,198 B2 | 5/2011 | Mukherjee et al. |
| 8,066,913 B2 | 11/2011 | Kikuya et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,129,048 B2 | 3/2012 | Hirakawa et al. |
| 8,158,278 B2 | 4/2012 | Tsutsumi et al. |
| 8,163,409 B2 | 4/2012 | Fujikawa et al. |
| 8,197,971 B2 | 6/2012 | Skotheim et al. |
| 8,264,205 B2 | 9/2012 | Kopera |
| 8,268,474 B2 | 9/2012 | Kim et al. |
| 8,338,034 B2 | 12/2012 | Affinito et al. |
| 8,415,054 B2 | 4/2013 | Skotheim et al. |
| 8,415,071 B2 | 4/2013 | Tanaka et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,916,284 B2 | 12/2014 | Jang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,012,049 B2 | 4/2015 | Fetzer et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,118,085 B2 | 8/2015 | Ikeda |
| 9,177,689 B2 | 11/2015 | Paulsen et al. |
| 9,209,428 B2 | 12/2015 | Jung et al. |
| 9,214,678 B2 | 12/2015 | Mikhaylik |
| 9,219,268 B2 | 12/2015 | Guen et al. |
| 9,287,540 B2 | 3/2016 | Huang |
| 9,287,551 B2 | 3/2016 | Kang et al. |
| 9,306,197 B2 | 4/2016 | Byun et al. |
| 9,306,252 B2 | 4/2016 | Kristofek et al. |
| 9,391,344 B2 | 7/2016 | Kwon et al. |
| 9,397,342 B2 | 7/2016 | Skotheim et al. |
| 9,399,404 B2 | 7/2016 | Ose et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,673,474 B2 | 6/2017 | Nakaishi |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,271 B2 | 12/2017 | Iwase et al. |
| 9,853,287 B2 | 12/2017 | Mikhaylik et al. |
| 9,947,963 B2 | 4/2018 | Du et al. |
| 9,972,811 B2 * | 5/2018 | Ogawa ............... H01M 50/258 |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |

(56) References Cited

U.S. PATENT DOCUMENTS

| | | |
|---|---|---|
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,446,894 B2 | 10/2019 | Paramasivam et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 10,608,278 B2 | 3/2020 | Liao et al. |
| 10,629,947 B2 | 4/2020 | Affinito et al. |
| 10,629,954 B2 | 4/2020 | Mikhaylik et al. |
| 10,720,648 B2 | 7/2020 | Quero-Mieres et al. |
| 10,847,833 B2 | 11/2020 | Bunte et al. |
| 10,862,105 B2 | 12/2020 | Gronwald et al. |
| 10,868,306 B2 | 12/2020 | Mudalige et al. |
| 10,879,527 B2 | 12/2020 | Laramie et al. |
| 10,944,094 B2 | 3/2021 | Liao et al. |
| 10,965,130 B2 | 3/2021 | Mikhaylik et al. |
| 10,991,925 B2 | 4/2021 | Wang et al. |
| 11,024,923 B2 | 6/2021 | Liao et al. |
| 11,038,178 B2 | 6/2021 | Liao et al. |
| 11,041,248 B2 | 6/2021 | Laramie et al. |
| 11,056,728 B2 | 7/2021 | Mikhaylik et al. |
| 11,088,395 B2 | 8/2021 | Mikhaylik et al. |
| 11,108,076 B2 | 8/2021 | Scordilis-Kelley et al. |
| 11,108,077 B2 | 8/2021 | Scordilis-Kelley et al. |
| 11,121,397 B2 | 9/2021 | Scordilis-Kelley et al. |
| 11,165,122 B2 | 11/2021 | Laramie et al. |
| 11,183,690 B2 | 11/2021 | Wang et al. |
| 11,228,055 B2 | 1/2022 | Liao et al. |
| 11,233,243 B2 | 1/2022 | Affinito et al. |
| 11,239,504 B2 | 2/2022 | Laramie et al. |
| 11,245,103 B2 | 2/2022 | Mikhaylik et al. |
| 11,251,501 B2 | 2/2022 | Schneider et al. |
| 11,276,903 B2 | 3/2022 | Tamaru et al. |
| 2001/0000485 A1 | 4/2001 | Ying et al. |
| 2001/0005561 A1 | 6/2001 | Yamada et al. |
| 2001/0041294 A1 | 11/2001 | Chu et al. |
| 2002/0012846 A1 | 1/2002 | Skotheim et al. |
| 2002/0192557 A1 | 12/2002 | Choi et al. |
| 2003/0069489 A1 | 4/2003 | Abreu |
| 2003/0113624 A1 | 6/2003 | Kim et al. |
| 2003/0124416 A1 | 7/2003 | Kaneta |
| 2004/0081887 A1 | 4/2004 | Sugiyama et al. |
| 2005/0042515 A1 | 2/2005 | Hwang et al. |
| 2005/0130041 A1 | 6/2005 | Fensore |
| 2005/0175903 A1 | 8/2005 | Kim et al. |
| 2005/0196672 A1 | 9/2005 | Mukherjee et al. |
| 2006/0024579 A1 | 2/2006 | Kolosnitsyn et al. |
| 2006/0115579 A1 | 6/2006 | Mukherjee et al. |
| 2006/0115735 A1 | 6/2006 | Yasuda et al. |
| 2006/0234117 A1 | 10/2006 | Fujikawa et al. |
| 2006/0238203 A1 | 10/2006 | Kelley et al. |
| 2007/0141449 A1 | 6/2007 | Kim |
| 2007/0221265 A1 | 9/2007 | Affinito et al. |
| 2007/0224502 A1 | 9/2007 | Affinito et al. |
| 2008/0187663 A1 | 8/2008 | Affinito |
| 2008/0213672 A1 | 9/2008 | Skotheim et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2009/0077794 A1 | 3/2009 | Hirakawa et al. |
| 2009/0200986 A1 | 8/2009 | Kopera et al. |
| 2010/0035128 A1 | 2/2010 | Scordilis-Kelley et al. |
| 2010/0129699 A1 | 5/2010 | Mikhaylik et al. |
| 2010/0143823 A1 | 6/2010 | Tanaka et al. |
| 2010/0203370 A1 | 8/2010 | Pozin et al. |
| 2010/0239914 A1 | 9/2010 | Mikhaylik et al. |
| 2010/0285360 A1 | 11/2010 | Kozinsky et al. |
| 2011/0006738 A1 | 1/2011 | Mikhaylik et al. |
| 2011/0014524 A1 | 1/2011 | Skotheim et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0250485 A1 | 10/2011 | Tsukuda |
| 2011/0256450 A1 | 10/2011 | Campbell et al. |
| 2012/0044660 A1 | 2/2012 | Rappoport et al. |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2013/0017441 A1 | 1/2013 | Affinito et al. |
| 2013/0095380 A1 | 4/2013 | Affinito et al. |
| 2013/0216915 A1 | 8/2013 | Affinito et al. |
| 2013/0316072 A1 | 11/2013 | Scordilis-Kelley et al. |
| 2014/0272594 A1 | 9/2014 | Safont Sempere et al. |
| 2014/0272595 A1 | 9/2014 | Cristadoro et al. |
| 2015/0079452 A1* | 3/2015 | Park ............ H01M 50/264 429/156 |
| 2015/0129332 A1 | 5/2015 | Seto et al. |
| 2015/0162586 A1 | 6/2015 | Fleischmann et al. |
| 2015/0180084 A1 | 6/2015 | Scordilis-Kelley et al. |
| 2015/0188194 A1 | 7/2015 | Mikhaylik et al. |
| 2015/0287986 A1 | 10/2015 | Affinito et al. |
| 2016/0118638 A1 | 4/2016 | Gronwald et al. |
| 2016/0118651 A1 | 4/2016 | Kovalev et al. |
| 2016/0126541 A1 | 5/2016 | Goto et al. |
| 2016/0218398 A1 | 7/2016 | Yonehara et al. |
| 2017/0141385 A1 | 5/2017 | Scordilis-Kelley et al. |
| 2017/0141402 A1 | 5/2017 | Affinito et al. |
| 2018/0006303 A1 | 1/2018 | Mikhaylik et al. |
| 2018/0048018 A1 | 2/2018 | Scordilis-Kelley et al. |
| 2018/0254516 A1 | 9/2018 | Han et al. |
| 2018/0261820 A1 | 9/2018 | Liao et al. |
| 2018/0269520 A1 | 9/2018 | Scordilis-Kelley et al. |
| 2018/0301697 A1 | 10/2018 | Affinito et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0386334 A1 | 12/2019 | Scordilis-Kelley et al. |
| 2020/0044460 A1 | 2/2020 | Mikhaylik et al. |
| 2020/0091547 A1 | 3/2020 | Scordilis-Kelley et al. |
| 2020/0194822 A1 | 6/2020 | Laramie et al. |
| 2020/0220146 A1 | 7/2020 | Laramie et al. |
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0313225 A1 | 10/2020 | Scordilis-Kelley et al. |
| 2020/0350631 A1 | 11/2020 | Mikhaylik et al. |
| 2020/0373551 A1 | 11/2020 | Milobar et al. |
| 2020/0373578 A1 | 11/2020 | Wang et al. |
| 2020/0395585 A1 | 12/2020 | Laramie et al. |
| 2020/0411916 A1 | 12/2020 | Nam et al. |
| 2021/0057753 A1 | 2/2021 | Viner et al. |
| 2021/0135192 A1 | 5/2021 | Gronwald et al. |
| 2021/0135205 A1 | 5/2021 | Laramie et al. |
| 2021/0135297 A1 | 5/2021 | Mikhaylik et al. |
| 2021/0138673 A1 | 5/2021 | Shannon et al. |
| 2021/0151815 A1 | 5/2021 | Milobar et al. |
| 2021/0151816 A1 | 5/2021 | Shayan et al. |
| 2021/0151817 A1 | 5/2021 | Jennings et al. |
| 2021/0151830 A1 | 5/2021 | Shayan et al. |
| 2021/0151839 A1 | 5/2021 | Niedzwiecki et al. |
| 2021/0151840 A1 | 5/2021 | Shayan et al. |
| 2021/0151841 A1 | 5/2021 | Johnson et al. |
| 2021/0193984 A1 | 6/2021 | Laramie et al. |

(56) References Cited

U.S. PATENT DOCUMENTS

| | | | |
|---|---|---|---|
| 2021/0193985 A1 | 6/2021 | Laramie et al. | |
| 2021/0193996 A1 | 6/2021 | Laramie et al. | |
| 2021/0194069 A1 | 6/2021 | Hamblin et al. | |
| 2021/0218243 A1 | 7/2021 | Hamblin et al. | |
| 2021/0249651 A1 | 8/2021 | Laramie et al. | |
| 2021/0265610 A1 | 8/2021 | Liao et al. | |
| 2021/0328274 A1 | 10/2021 | Mikhaylik et al. | |
| 2021/0351472 A1* | 11/2021 | Terauchi | H01M 50/264 |
| 2021/0408550 A1 | 12/2021 | Liao et al. | |
| 2021/0408598 A1 | 12/2021 | Mikhaylik et al. | |
| 2022/0029191 A1 | 1/2022 | Scordilis-Kelley et al. | |

FOREIGN PATENT DOCUMENTS

| | | | | |
|---|---|---|---|---|
| CA | 2310697 A1 | 12/2000 | | |
| CA | 2404507 A1 | 10/2001 | | |
| CN | 1121264 A | 4/1996 | | |
| CN | 1430304 A | 7/2003 | | |
| CN | 1874027 A | 12/2006 | | |
| CN | 102144324 A | 8/2011 | | |
| CN | 104781947 A | 7/2015 | | |
| CN | 109285976 A | 1/2019 | | |
| DE | 102010031641 A1 * | 1/2012 | | H01M 10/02 |
| DE | 102012220393 A1 * | 5/2014 | | H01M 2/024 |
| EP | 0 584 639 A1 | 3/1994 | | |
| EP | 0 700 109 A1 | 3/1996 | | |
| EP | 1 144 730 B1 | 9/2002 | | |
| EP | 1 171 387 B1 | 11/2005 | | |
| EP | 0 700 109 B1 | 10/2006 | | |
| EP | 1 717 879 A1 | 11/2006 | | |
| EP | 1 059 681 B1 | 1/2007 | | |
| EP | 1 194 976 B1 | 2/2007 | | |
| EP | 1 768 202 A1 | 3/2007 | | |
| EP | 0 851 522 B1 | 9/2009 | | |
| EP | 1 137 091 B1 | 5/2011 | | |
| EP | 1 137 093 B1 | 12/2011 | | |
| EP | 1 083 618 B1 | 4/2013 | | |
| EP | 2 104 163 B1 | 6/2014 | | |
| EP | 2 471 140 B1 | 2/2015 | | |
| EP | 2 439 807 B1 | 12/2015 | | |
| EP | 3 051 621 A1 | 8/2016 | | |
| EP | 2 713 432 B1 | 8/2017 | | |
| EP | 2 144 312 B1 | 9/2017 | | |
| JP | S58-164169 A | 9/1983 | | |
| JP | H04-294071 A | 10/1992 | | |
| JP | H06-124700 A | 5/1994 | | |
| JP | H10-55823 A | 2/1998 | | |
| JP | H10-214638 A | 8/1998 | | |
| JP | H11-121045 A | 4/1999 | | |
| JP | H11-219731 A | 8/1999 | | |
| JP | 2000-268866 A | 9/2000 | | |
| JP | 2000-268873 A | 9/2000 | | |
| JP | 2001-093577 A | 4/2001 | | |
| JP | 2001-143757 A | 5/2001 | | |
| JP | 3261688 B2 | 3/2002 | | |
| JP | 2003-297431 A | 10/2003 | | |
| JP | 2003-303579 A | 10/2003 | | |
| JP | 2004-213902 A | 7/2004 | | |
| JP | 2004-319489 A | 11/2004 | | |
| JP | 2005-056701 A | 3/2005 | | |
| JP | 2005-063848 A | 3/2005 | | |
| JP | 2005-353452 A | 12/2005 | | |
| JP | 2006-310033 A | 11/2006 | | |
| JP | 2006-310281 A | 11/2006 | | |
| JP | 2006-313737 A | 11/2006 | | |
| JP | 2006-318892 A | 11/2006 | | |
| JP | 2007-048750 A | 2/2007 | | |
| JP | 2007-257850 A | 10/2007 | | |
| JP | 2009-076260 A | 4/2009 | | |
| JP | 2009-104902 A | 5/2009 | | |
| JP | 2011-530784 A | 12/2011 | | |
| JP | 2013-097988 A | 5/2013 | | |
| JP | 2016-033985 A | 3/2016 | | |
| JP | 2019-216073 A | 12/2019 | | |
| WO | WO 95/26055 A1 | 9/1995 | | |
| WO | WO 99/05743 A1 | 2/1999 | | |
| WO | WO 99/33125 A1 | 7/1999 | | |
| WO | WO 99/33130 A1 | 7/1999 | | |
| WO | WO 01/31722 A1 | 5/2001 | | |
| WO | WO 01/039302 | 5/2001 | | |
| WO | WO 02/095849 A1 | 11/2002 | | |
| WO | WO 2007/075867 A2 | 7/2007 | | |
| WO | WO 2007/097172 A1 | 8/2007 | | |
| WO | WO 2009/017726 A1 | 2/2009 | | |
| WO | WO 2009/042071 A2 | 4/2009 | | |
| WO | WO 2009/054987 A1 | 4/2009 | | |
| WO | WO 2009/089018 A2 | 7/2009 | | |
| WO | WO 2012/010347 A1 | 1/2012 | | |
| WO | WO 2012/174393 A1 | 12/2012 | | |
| WO | WO 2018/055858 A1 | 3/2018 | | |

OTHER PUBLICATIONS

PCT/US2020/038375, Aug. 21, 2020, Invitation to Pay Additional Fees.
PCT/US2020/038375, Oct. 28, 2020, International Search Report and Written Opinion.
PCT/US2020/038375, Dec. 30, 2021, International Preliminary Report on Patentability.
Office Action for CN Application No. 202080044721.6 dated Jul. 7, 2023.
Extended European Search Report for EP Application No. 20825739.4 dated Apr. 15, 2024.
Invitation to Pay Additional Fees for International Application No. PCT/US2020/038375 mailed Aug. 21, 2020.
International Search Report and Written Opinion for International Application No. PCT/US2020/038375 mailed Oct. 28, 2020.
International Preliminary Report on Patentability for International Application No. PCT/US2020/038375 mailed Dec. 30, 2021.
[No Author Listed], Material Technology for Lithium Secondary Battery (I). Korea Institute of Science and Technology Information. 2004:p. 33.
Affinito et al., Increasing Li—S Battery Cycle Life, and Improving Safety, through Application of a Variety of Coating Techniques. Soc Vac Coat 54$^{th}$ Ann. 2011:589-92.
Anderson et al., Development Process and Overview of Y14.5-2009 Changes. American Society of Mechanical Engineers. Oct. 2009;221 pages.
Chen et al., Recent advances in lithium-sulfur batteries. Journal of Power Sources. 2014;267:770-83. Epub Jun. 19, 2014.
Gireaud et al., Lithium metal stripping/plating mechanism studies: A metallurgical approach. Electrochemistry Communications. 2006;8:1639-49.
Hirai et al., Influence of electrolyte on lithium cycling efficiency with pressurized electrode stack. J. Electrochem. Soc. 1994;141:611-14.
Huggins, Lithium alloy negative electrodes. Journal of Power Sources. 1999;81-82:13-19.
Kim, Recent Developments in Anode Materials for Li Secondary Batteries. Journal of the Korean Electrochemical Society. 2008;11(3):211-22.
Psoma et al., Comparative Assessment of Different Sacrificial Materials for Releasing SU-8 Structures. Rev. Adv. Mater. Sci. 2005;10:149-55.
Yang et al., Small particle size multiphase Li—alloy anodes for lithium-ion-batteries. Solid State Ionics. 1996;90:281-7.
Office Action for KR Application No. 10-2022-7002078 dated May 2, 2025.

* cited by examiner

METHODS, SYSTEMS, AND DEVICES FOR APPLYING FORCES TO ELECTROCHEMICAL DEVICES

RELATED APPLICATIONS

This application is a national stage filing under 35 U.S.C. § 371 of International Patent Application No. PCT/US2020/038375, filed Jun. 18, 2020, and entitled "Methods, Systems, and Devices for Applying Forces to Electrochemical Devices," which claims priority under 35 U.S.C. § 119(e) to U.S. Provisional Application No. 62/864,831, filed Jun. 21, 2019, and entitled "Methods, Systems, and Devices for Applying Forces to Electrochemical Devices," each of which is incorporated herein by reference in its entirety for all purposes.

TECHNICAL FIELD

Methods, systems, and devices for applying forces to electrochemical devices are generally described.

BACKGROUND

Electrochemical cells typically include electrodes comprising electrode active materials that participate in an electrochemical reaction to produce electric current. Applying a force to at least a portion of an electrochemical cell (e.g., during cycling of the cell) can improve the performance of the electrochemical cell. Certain embodiments of the present disclosure are directed to inventive methods, systems, and devices relating to applying forces to electrochemical cells.

SUMMARY

Methods, systems, and devices for applying forces to electrochemical devices are generally described. In some cases, the methods include applying a force to an electrochemical device via a solid surface that, in the absence of an applied force, has at least a portion that is convex with respect to a side of the electrochemical device. Certain embodiments are related to systems and devices for applying a force to an electrochemical cell, with some of the systems and devices employing, for example, solid articles with certain shapes (e.g., convex shapes in the absence of an applied force) and/or inventive couplings. The subject matter of the present invention involves, in some cases, interrelated products, alternative solutions to a particular problem, and/or a plurality of different uses of one or more systems and/or articles.

In one aspect, methods are described. In some embodiments, the method comprises applying a force to a side of an electrochemical device via a solid surface. In some embodiments, at least a portion of the solid surface is convex with respect to the side of the electrochemical device in the absence of an applied force. In some embodiments, the applying causes the solid surface to deform such that the solid surface becomes less convex.

In some embodiments, the method comprises applying a force to a solid article that is proximate to an electrochemical device such that a solid surface of the solid article is deformed. In some embodiments, the applying is performed via a coupling comprising a surface portion in contact with an exterior surface opposite the solid surface. In some embodiments, the deforming causes relative rotational motion between a contour of the exterior surface and a contour of the surface portion of the coupling that interfaces with the contour of the exterior surface.

In some embodiments, the method comprises applying a force to a first solid article that is proximate to an electrochemical device such that a solid surface of the first solid article is deformed. In some embodiments, the applying is performed via a coupling, the coupling comprising a surface portion in contact with an exterior surface opposite the solid surface, and a fastener interfacing with the surface portion of the coupling. In some embodiments, a contour of the exterior surface interfaces with a contour of the surface portion of the coupling such that, when the force is applied, the fastener experiences a bending moment that is smaller than the bending moment that the fastener would experience if the exterior surface and the surface portion of the coupling were flat but under otherwise identical conditions.

In some embodiments, the method comprises applying a force to an electrochemical device via a solid surface. In some embodiments, the solid surface is shaped such that the force applied to the electrochemical cell causes a more uniform utilization of electrode active material in the electrochemical device during cycling relative to the utilization of the electrode active material that would be achieved using a flat solid surface but under otherwise identical conditions.

In another aspect, systems are provided. In some embodiments, the system comprises an electrochemical device comprising a first side and a second side opposite the first side. In some embodiments, the system comprises a device configured to apply a force to the electrochemical device. In some cases, the device comprises a solid surface that is proximate to the first side of the electrochemical device and that is, in the absence of an applied force, convex with respect to the first side of the electrochemical cell.

In another aspect, devices are provided. In some embodiments, the device comprises a first solid article, a second solid article, and a coupling connecting the first solid article to the second solid article. In some embodiments, the coupling comprises a surface portion having a contour that interfaces with a contoured surface of the first solid article.

In some embodiments, the device comprises a first solid article comprising a first solid surface and a second solid article comprising a second solid surface. In some embodiments, the first solid surface has a first shape that, in the absence of an applied force, is convex with respect to the second solid surface. In some embodiments, under at least one magnitude of applied force, the first solid surface has a second shape that is less convex than the first shape with respect to the second solid surface.

In some embodiments, the device comprises a first solid article comprising a first solid surface and a second solid article comprising a second solid surface. In some embodiments, in the absence of an applied force, the first solid surface is not substantially parallel to the second solid surface. In some embodiments, under at least one magnitude of applied force the first solid article and/or the second solid article deforms such that the first solid surface becomes substantially parallel to the second surface.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
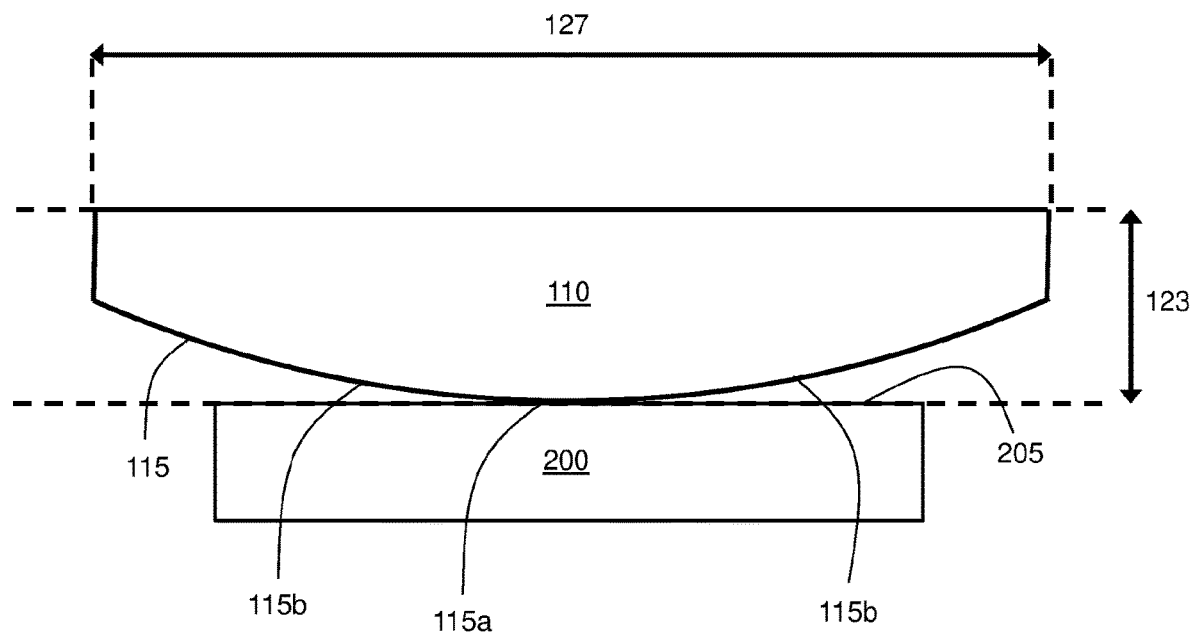
FIG. 1A shows a schematic illustration of a front view of an exemplary electrochemical device and a solid surface in the absence of an applied force, according to certain embodiments.

Methods, systems, and devices for applying forces to electrochemical devices are generally described. Certain of the methods, systems, and devices relate to the application of force to a side of an electrochemical device (e.g., a battery or a stack of batteries) via a solid surface whose shape is selected such that the resulting pressure experienced by the electrochemical device causes improved performance of the electrochemical device (e.g., during charging and/or discharging) relative to cases in which a force is applied via an object lacking that shape. In some non-limiting cases, the methods include applying a force to an electrochemical device via a solid surface that, in the absence of an applied force, has at least a portion that is convex with respect to a side of the electrochemical device. For example, the force may be applied using a device that contains one or more solid articles, at least a portion of the surface of which has a shape selected to distribute the applied force in a desired manner (e.g., a convex shape).

Applying the force to the component comprising the solid surface may result in the deformation of the solid surface. In certain cases, the shape of the solid surface in the absence of the applied force is such that when the solid surface is deformed, the electrochemical device experiences a desired pressure distribution. For example, in some cases, a uniform pressure distribution, or a pressure distribution with a desired gradient is achieved. Such desired pressure distributions can, in some cases, lead to improved performance of the electrochemical device. Using solid surfaces having shapes that allow for desired performance even upon force-induced deformation, relatively lightweight but deformation-prone components (e.g., aluminum plates) can be used to apply the force, which can lead to improved energy densities.

Certain embodiments are also directed to devices comprising couplings that can be used to apply a force to the device containing one or more solid articles. In some cases, the couplings contain a surface portion that interfaces with the solid articles such that even when the solid articles deform under the load, the coupling experiences relatively little torque, bending, or other adverse mechanical effects that may be associated with the deformation. It has been discovered that one way in which the couplings may advantageously interface with the solid articles is by arranging a coupling having a surface portion with a contour (e.g., a convex fastener contour) that interfaces with a contour of an exterior surface opposite the solid surface (e.g., a concave contour). For example, it has been discovered that one way in which the couplings may advantageously interface with the solid articles is by arranging a coupling having a surface portion with a contour (e.g., a convex fastener contour) that interfaces with a contour of the exterior surface of the solid article (e.g., a concave solid article contour).

In some cases, the application of force to an electrochemical device can lead to improved performance of that electrochemical device during charging and/or discharging. For example, in some cases, applying an anisotropic force with a component normal to an active surface of an electrode of the electrochemical device can reduce problems (such as surface roughening of the electrode) while improving current density. One such example is the case where lithium metal or a lithium metal alloy is used as an anode active material. One way in which such a force may be applied to an electrochemical device is by using one or more solid articles. For example, the electrochemical device and the solid article can be placed in proximity to each other, and the solid article can pressed against the electrochemical device. It may be desirable to use solid articles containing materials that have a relatively low mass density (e.g., light metals such as aluminum) in order to maintain high energy densities for the overall system. However, it has been observed that when solid articles comprising such materials are used to apply a force to an electrochemical device, they can deform. In some cases, such deformation results in the electrochemical device experiencing uneven stress and experiencing an undesirable pressure distribution, which can cause problems such as uneven utilization of electrode active material (e.g., lithium). It has been discovered that judicious choice of the shape of the surface used to apply the force to the electrochemical device (e.g., the surface of a solid article) can reduce or eliminate problems associated with such deformation. For example, a surface that has a convex shape with respect to the electrochemical device in the absence of the applied force may deform under at least one magnitude of applied force such that a desired distribution of the force is applied. In contrast, an otherwise identical surface lacking the convex shape may cause too uneven of a force to be experienced in certain regions of the electrochemical device when the solid surface deforms. For example, in certain cases where the force is applied via couplings proximate to the ends of the solid article, the absence of the convex shape can cause relatively large forces to be applied near the ends of the solid article and relatively small forces to be applied near the middle of the solid article. Certain embodiments directed to these insights are described below.

In some aspects, methods and devices for applying a force to an electrochemical device are described.

In some embodiments, the method comprises applying a force to a side of an electrochemical device. FIG. 1A depicts a schematic illustration of a side view of exemplary electrochemical device 200, and certain methods comprise applying a force to side 205 of electrochemical device 200. As mentioned above, in some cases, applying a force to a side of the electrochemical device can improve the performance of the electrochemical device (e.g., during cycling). For example, the application of force may reduce irregularity or roughening of an electrode surface of the electrochemical device (e.g., when lithium metal or lithium alloy-containing anodes are employed), thereby improving performance.

Figure 2:
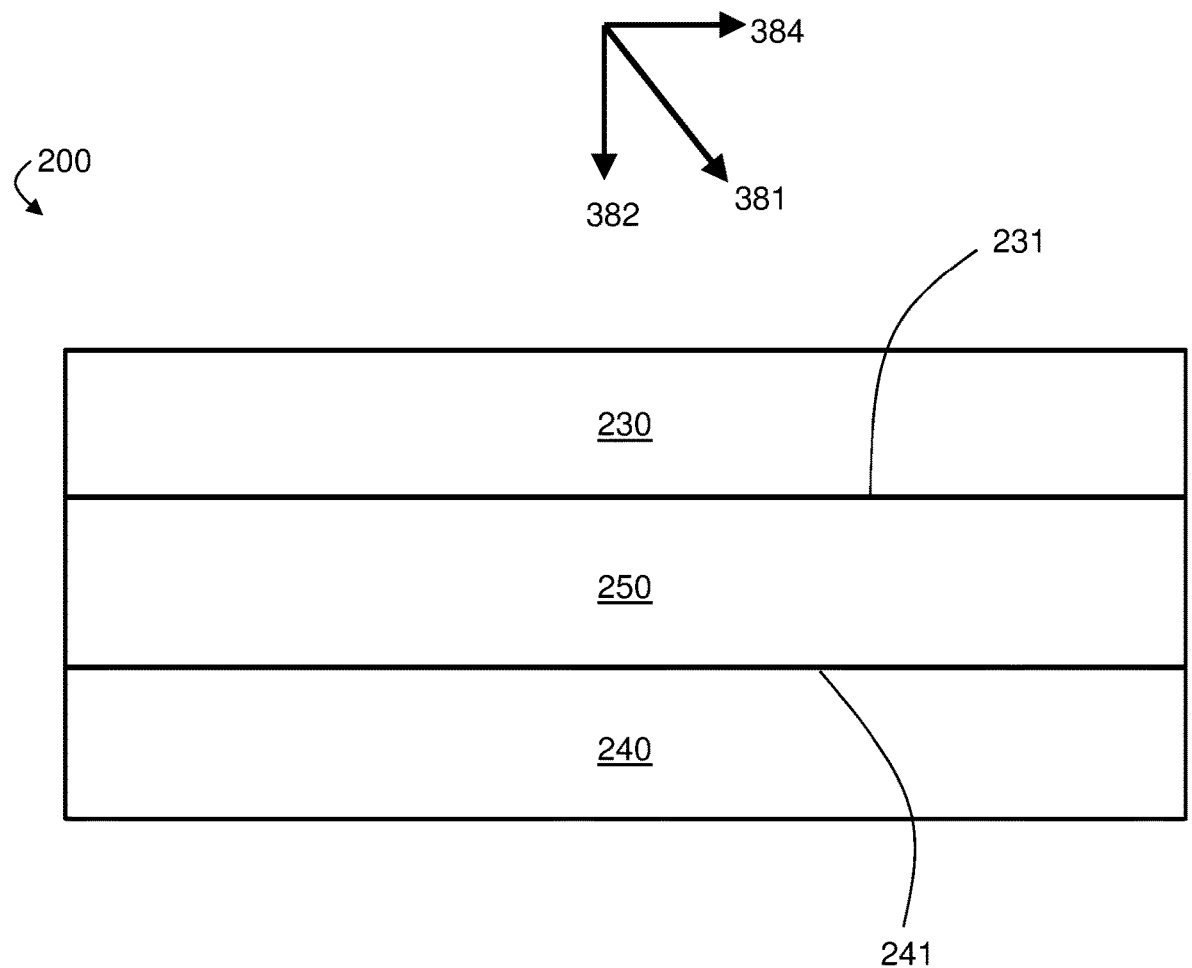
FIG. 2 shows a schematic cross-sectional illustration of an electrochemical device, according to certain embodiments.

The applied force may, in some instances, comprise an anisotropic component normal to an active surface of the anode of the electrochemical device. Referring to FIG. 2, which depicts a schematic cross-sectional illustration of exemplary electrochemical device 200, a force may be applied to the side of the electrochemical device 200 in the direction of arrow 381. Arrow 382 illustrates the component of force 381 that is normal to active surface 231 of electrode 230 (as well as active surface 241 of electrode 240). In the case of a curved surface (e.g., active surface), for example, a concave surface or a convex surface, the force may comprise an anisotropic force with a component normal to a plane that is tangent to the curved surface at the point at which the force is applied. In some embodiments, a device (e.g., a "pressure rig" or containment structure) is configured to apply the force to the electrochemical device, as described in more detail below.

In some embodiments, the electrochemical device to which the force is applied comprises at least one anode. Referring again to FIG. 2, electrochemical device 200 comprises anode 230, according to certain embodiments. In some cases, the anode comprises an anode active material. As used herein, an "anode active material" refers to any electrochemically active species associated with an anode. In some embodiments, the anode comprises lithium metal and/or a lithium metal alloy as an anode active material. For example, referring again to FIG. 2, anode 230 comprises lithium metal and/or a lithium metal alloy as an anode active material in some embodiments. The anode can comprise, in accordance with certain embodiments, lithium metal and/or a lithium metal alloy as an electrode active material during at least a portion of or during all of a charging and/or discharging process of the electrochemical device (e.g., a battery). In certain cases, the anode is or comprises vapor-deposited lithium (e.g., a vapor-deposited lithium film). Additional suitable anode active materials are described in more detail below. Certain embodiments described herein may be directed to systems, devices, and methods that may allow for improved performance (e.g., uniformity of lithium deposition during charging) of electrochemical devices comprising certain anodes, such as lithium metal-containing anodes.

In some embodiments, the electrochemical device comprises a cathode. In some cases, the cathode comprises a cathode active material. As used herein, a "cathode active material" refers to any electrochemically active species associated with a cathode. In certain cases, the cathode active material may be or comprise a lithium intercalation compound (e.g., a metal oxide lithium intercalation compound). As one non-limiting example, in some embodiments, cathode 240 in FIG. 2 comprises a nickel-cobalt-manganese lithium intercalation compound. Suitable cathode materials are described in more detail below.

As used herein, "cathode" refers to the electrode in which an electrode active material is oxidized during charging and reduced during discharging, and "anode" refers to the electrode in which an electrode active material is reduced during charging and oxidized during discharging.

In some embodiments, the electrochemical device comprises a separator between the anode and the cathode. FIG. 2 shows exemplary separator 250 between anode 230 and cathode 240. In some cases, the separator is a porous separator. The separator may be a solid non-conductive or insulative material that separates or insulates the anode and the cathode from each other, preventing short circuiting, and that permits the transport of ions between the anode and the cathode. In some embodiments, the separator is porous and may be permeable to an electrolyte.

Some embodiments comprise applying a force to a side of an electrochemical device via a solid surface. For example, referring to FIG. 1B, certain embodiments comprise applying force 50 to side 205 of electrochemical device 200 via solid surface 115. The solid surface may be a part of a device (e.g., a containment structure) in which the electrochemical device resides (e.g., during cycling of the electrochemical device). Applying a force to a side of an electrochemical device via a solid surface may comprise pressing (or causing to be pressed) the solid surface against a portion of the electrochemical device, which may accomplished in a variety of ways, as described below. It should be understood that while in some cases the solid surface may be in direct contact with the electrochemical device while the force is applied, in certain cases, one or more intervening components (e.g., solid layers such as foam layers or electronic components) may be between the solid surface and the side of the electrochemical device while the force is applied. For example, in FIG. 1B, intervening components (e.g., layers) could be between solid surface 115 and side 205 of electrochemical device 200.

In some embodiments, at least a portion of the solid surface is convex with respect to the side of the electrochemical device in the absence of an applied force. For example, FIG. 1A shows solid surface 115, at least a portion of which is convex with respect to side 205 of electrochemical device 200 before the force has been applied, according to certain embodiments. As would be understood by one of ordinary skill in the art, a solid surface that has a given shape "in the absence of an applied force" is one that, when all external forces are removed from the object comprising that surface, always assumes that particular shape. Accordingly, a surface that has a convex shape in the absence of an applied force is one that always assumes a convex shape when all external forces are removed from the object comprising that surface. Generally, a first surface is convex with respect to a second surface when the first surface curves away from the second surface such that the first surface has an interior sub-portion and an exterior sub-portion surrounding the interior sub-portion, with the exterior sub-portion being farther away from the second surface than the interior sub-portion. (Stated another way, a surface that is convex relative to a second surface appears to be convex when viewed from the perspective of the second surface.) As a non-limiting example, solid surface 115 in FIG. 1A curves away from side 205 of electrochemical device 200 such that interior sub-portion 115a is closer to side 205 of electrochemical cell 200 than is exterior sub-portion 115b, according to certain embodiments. A portion of the surface that is convex with respect to a second surface "bulges outward" from the bulk of the object comprising the first surface toward the second surface (e.g., solid surface 115 bulges outward from the bulk of solid article 110 toward side 205 of electrochemical device 200, according to certain embodiments).

It should be understood that portions of surfaces being convex with respect to other surfaces refers to the external geometric surface of the portion. An external geometric surface of an object refers to the surface defining the outer boundaries of the object when analyzed on substantially the same scale as the maximum cross-sectional dimension of the object. Generally, the external geometric surface of an object does not include the internal surfaces, such as the surface defined by pores within a porous object.

Figure 3:
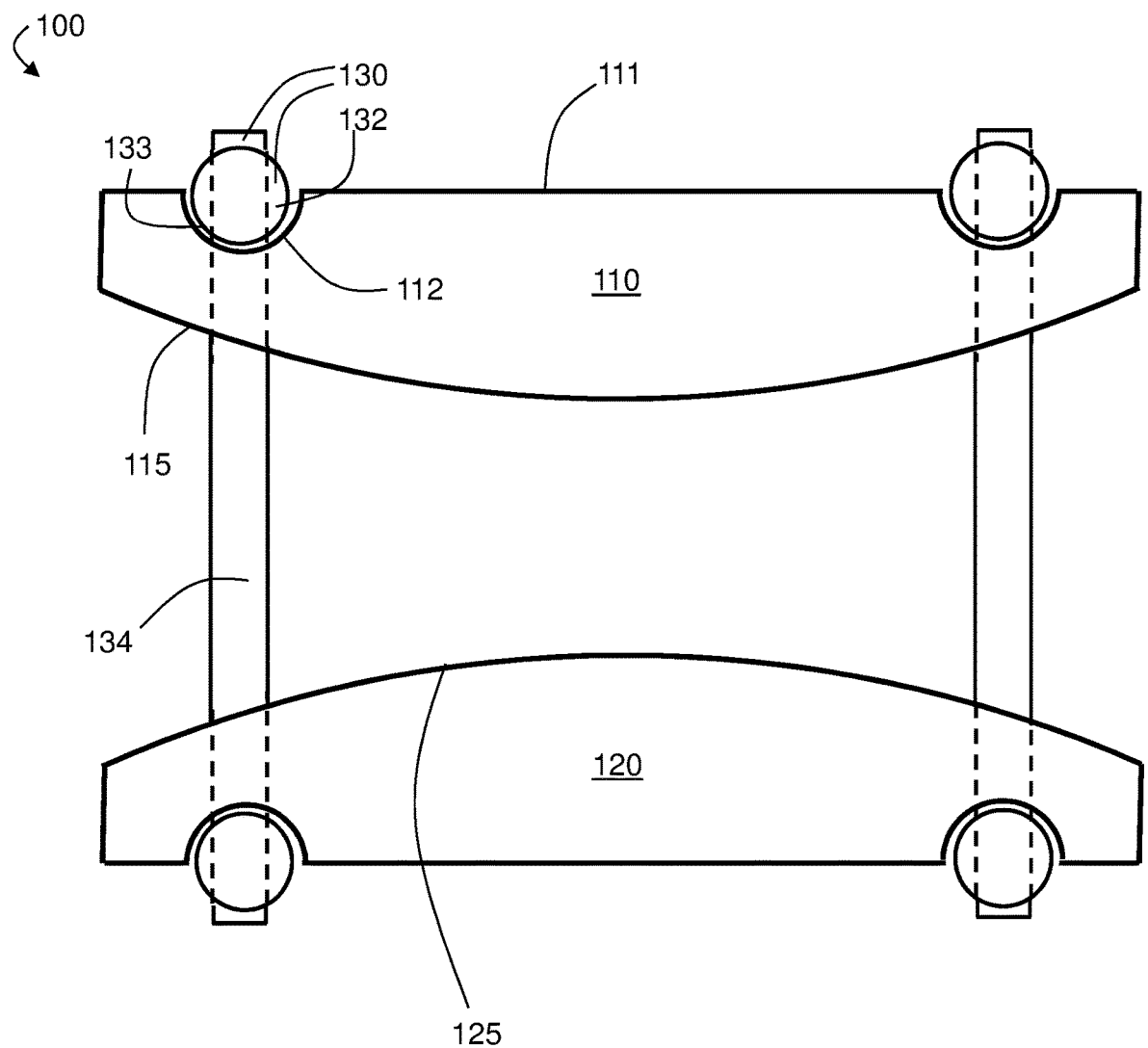
FIG. 3 shows a schematic illustration of a front view of an exemplary device for applying a force to an electrochemical device, according to certain embodiments.
Figure 4A:
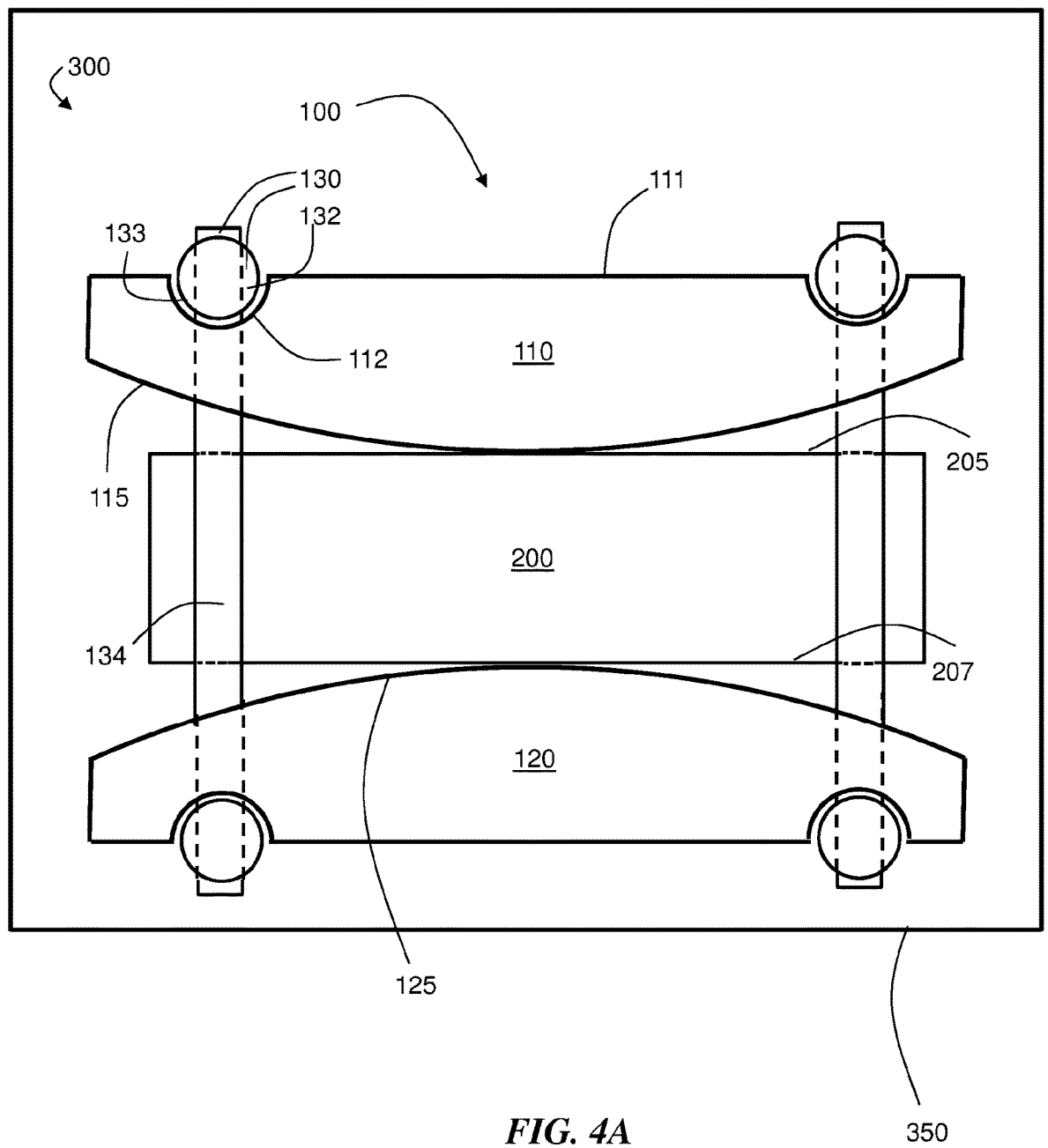
FIG. 4A shows a schematic illustration of a front view of an exemplary system comprising an electrochemical device and a device for applying a force to the electrochemical device, in the absence of an applied force, according to certain embodiments.

In some embodiments, the electrochemical device is a part of a system comprising the electrochemical device and a device configured to apply a force to the electrochemical device. FIG. 3 depicts a schematic illustration of a front view of exemplary device 100 configured to apply a force to an electrochemical device, and FIG. 4A depicts exemplary system 300 comprising device 100 and electrochemical device 200, according to certain embodiments. In some embodiments, the device configured to apply force to the electrochemical device comprises a solid surface proximate to the side of the electrochemical device. In some cases, the solid surface proximate to the side of the electrochemical device is within 1 cm, within 5 mm, within 1 mm, within 0.5 mm, within 100 µm, within 50 µm, within 10 µm, or less of the electrochemical device. In some cases, the force applied to the side of the electrochemical device is applied via that solid surface of the device. For example, referring again to FIG. 3, device 100 comprises solid surface 115, according to certain embodiments. Referring again to FIG. 4A, in some cases, a force can be applied to electrochemical device 200 via first solid surface 115 of device 100.

As mentioned above, in some cases, at least a portion of the solid surface via which the force is applied to a side of an electrochemical device is convex with respect to that side of the electrochemical device in the absence of an applied force. As such, in some cases, the solid surface of the device configured to apply a force to an electrochemical device is convex with respect to the side of the electrochemical device in the absence of an applied force. For example, in FIG. 4A, first solid surface 115 of device 100 is convex with respect to side 205 of electrochemical device 200.

Figure 1B:
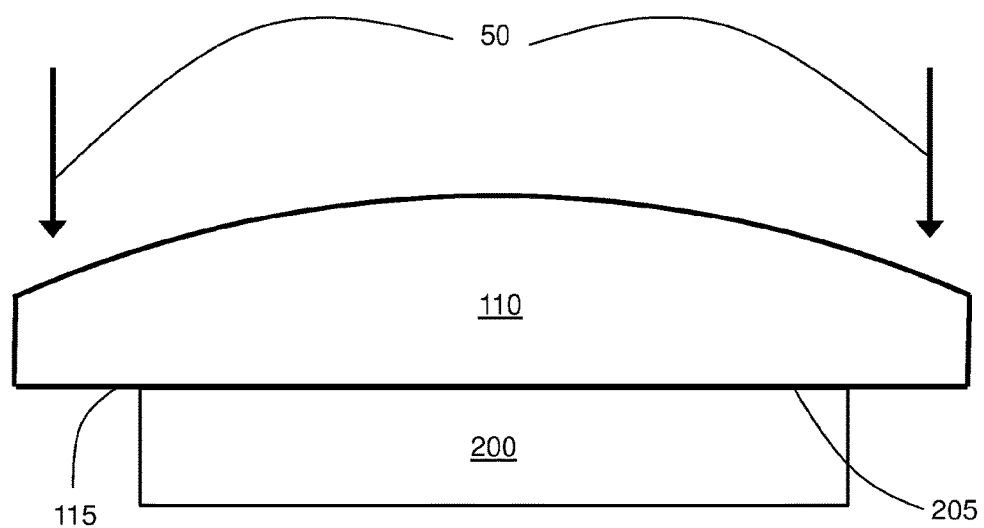
FIG. 1B shows a schematic illustration of a front view of an exemplary electrochemical device and a solid surface with a force being applied, according to certain embodiments.

In some embodiments, applying the force to the side of the electrochemical device causes the solid surface to deform such that the solid surface becomes less convex. For example, referring to FIGS. 1A-1B, applying force 50 to side 205 of electrochemical device 200 via solid surface 115 causes solid surface 115 to deform such that solid surface 115 is less convex (as shown in FIG. 1B) than it is in the absence of applied force 50 (as shown in FIG. 1A), according to certain embodiments. A surface becoming less convex refers generally to the curvature of the convex surface decreasing, such that the surface becomes more flat. Having a surface become less convex in the presence of the applied force to the side of the electrochemical device can, in certain embodiments, result in a desired pressure distribution across the side of the electrochemical device, which in some cases may improve the performance and durability of the electrochemical device. For example, a solid surface through which a force is applied may have a relatively more convex shape prior to the application of the force, and a relatively less convex (e.g., more flat) shape after the application of the force. The change in convexity may establish a desired pressure distribution across the electrochemical device during application of the force.

In some embodiments directed to systems comprising an electrochemical device and a device configured to apply force to the electrochemical device, a convex solid surface of the device configured to apply the force that is proximate to the side of the electrochemical device becomes less convex under at least one magnitude of applied force. For example, referring again to FIG. 4A-4B, solid surface 115 is convex with respect to side 205 of electrochemical device 200 in the absence of an applied force (e.g., in the absence of a load to device 100, as shown in FIG. 4A), but under force 50 (as shown in FIG. 4B), solid surface 115 of device 100 becomes less convex, according to certain embodiments.

Figure 4B:
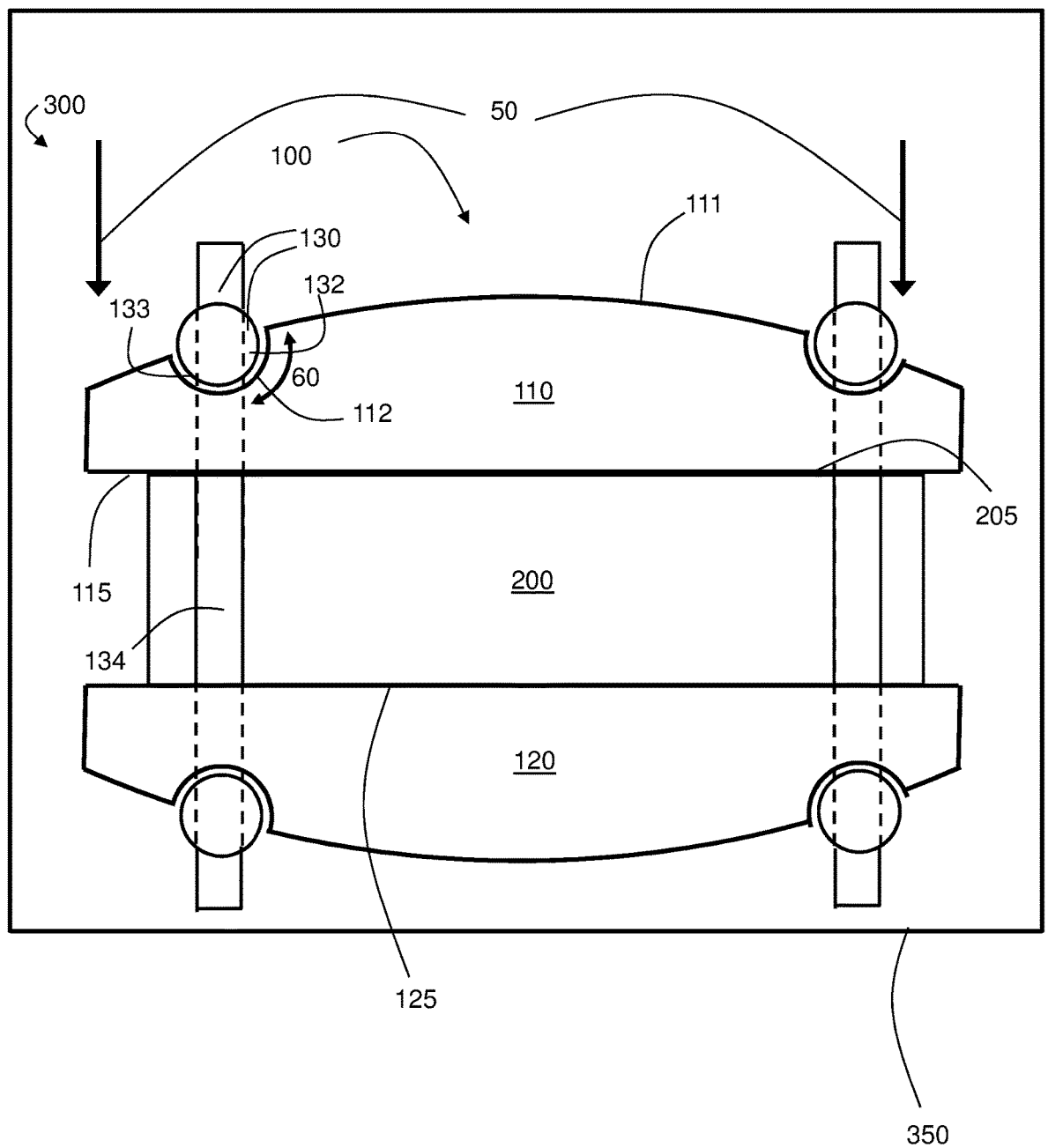
FIG. 4B shows a schematic illustration of a front view of an exemplary system comprising an electrochemical device and a device for applying a force to the electrochemical device, with a force being applied, according to certain embodiments.

In some embodiments, applying the force to the side of the electrochemical device causes the flatness of the solid surface to increase relative to the flatness of the solid surface in the absence of the applied force. For example, referring again to FIGS. 1A-1B, applying force 50 to side 205 of electrochemical device 200 via solid surface 115 (as shown in FIG. 1B) causes the flatness of solid surface 115 to increase relative to the flatness of solid surface 115 in the absence of applied force 50 (as shown in FIG. 1A). In other words, a device (e.g., device 100) described herein may comprise a solid surface that has, in the absence of an applied force, a first flatness, and under at least one magnitude of applied force, the solid surface has a second flatness that is greater than the first flatness. One such example is shown in FIGS. 4A and 4B, where device 100 comprises solid surface 115 that has a first flatness in the absence of an applied force (shown in FIG. 4A), and under applied force 50 in FIG. 4B, has a second flatness that is greater than the first flatness. The flatness of a solid surface may increase upon the application of a force due to that force compressing the surface such that the surface deforms.

Figure 1C:
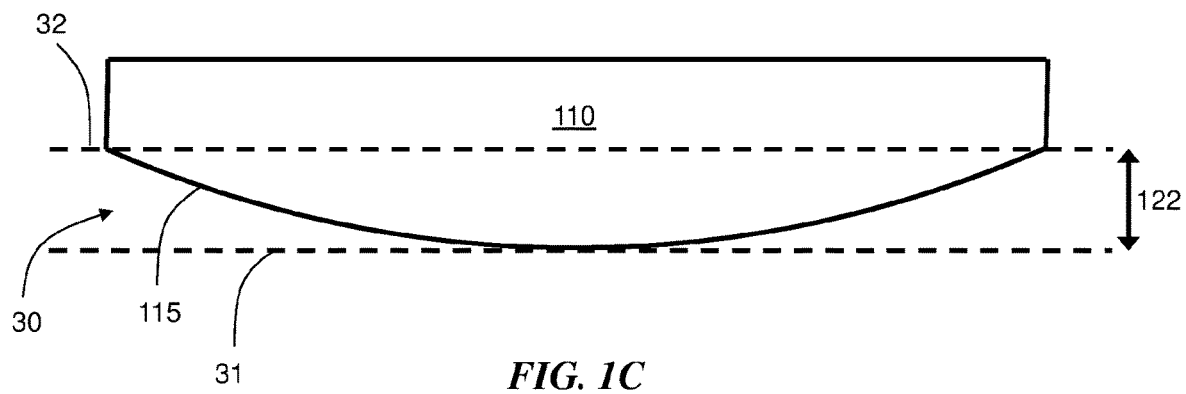
FIGS. 1C-1D show schematic illustrations of front views of an exemplary solid surface, with the exemplary solid surface in FIG. 1D being less convex and having a greater flatness than the solid surface in FIG. 1C, according to certain embodiments.
Figure 1D:
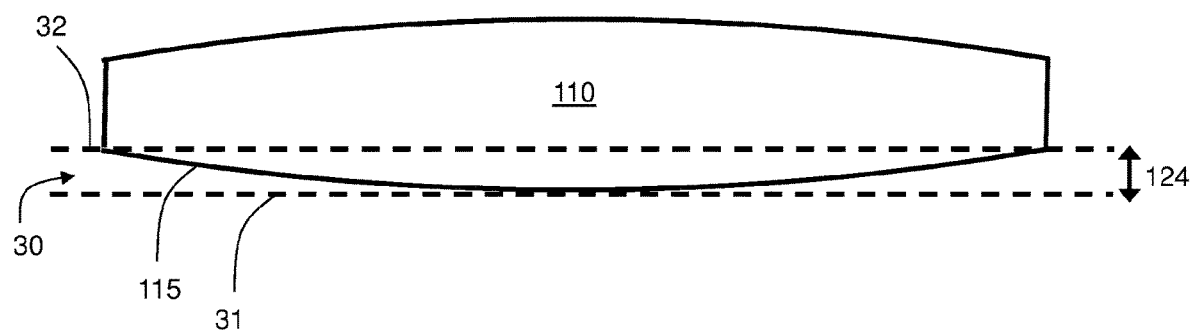

In some cases, applying the force causes the flatness tolerance of the solid surface to become smaller (e.g., "tighter") than in the absence of the applied force. The flatness tolerance can be measured, according to the ASME Y14.5-2009 standard, by determining the distance between the two parallel planes that define the tolerance zone for the surface. The tolerance zone can be determined by determining a three-dimensional profile of the surface (e.g., using a coordinate measuring machine (CMM), a vision or X-ray system, a height gauge, or any other suitable method), and then determining the smallest tolerance zone that contains the entire surface. As an example, referring to FIG. 1C, the flatness tolerance of solid surface 115 can be determined by determining tolerance zone 30 defined by plane 31 and plane 32, which is parallel to plane 31 (planes 31 and 32 being represented by dotted lines). In FIG. 1C, tolerance zone 30 is the smallest zone that contains the entirety of solid surface 115. Once the tolerance zone is determined, the distance between the parallel planes that define the tolerance zone is the flatness tolerance. For example, in FIG. 1C, the flatness tolerance of solid surface 115 is distance 122 between plane 31 and plane 32. It should be understood that, under the ASME Y14.5-2009 standard, a first surface is more flat than a second surface if the flatness tolerance of the first surface is smaller than the flatness tolerance of the second surface. For example referring to FIGS. 1C-1D, solid surface 115 in FIG. 1D has a smaller flatness tolerance than does solid surface 115 in FIG. 1C, because distance 124 in FIG. 1D is smaller than distance 122 in FIG. 1C. Solid surface 115 in FIG. 1D may be more flat (have a smaller flatness tolerance) than solid surface 115 in FIG. 1C due at least in part to the application of a force that causes deformation of solid surface 115.

In some embodiments, applying the force to the side of the electrochemical device causes an increase in the flatness of the solid surface relative to the flatness of the solid surface in the absence of the applied force. For example, the solid surface may be a part of a solid article, and the solid surface may, in the absence of an applied force, have a first shape having a first flatness, and under at least one magnitude of force, the solid surface may have a second shape having a second flatness, where the second flatness is greater than the first flatness. In other words, in some embodiments, the solid surface (e.g., a solid surface that is part of a device configured to apply a force to an electrochemical device) has, in the absence of an applied force, a first flatness tolerance, and under at least one magnitude of applied force, the solid surface has a second flatness tolerance that is smaller than the first flatness tolerance.

In some embodiments, applying the force to the side of the electrochemical device causes a relatively large increase in the flatness of the solid surface relative to the flatness of the solid surface in the absence of the applied force. In other words, in some embodiments, applying the force to the side of the electrochemical device causes a relatively large decrease in the flatness tolerance of the solid surface. Having a relatively large increase in the flatness of the solid surface may, in some cases, lead to a relatively uniform utilization of electrode active material and/or a relatively uniform pressure distribution across the electrochemical device during cycling, while using objects with a relatively low mass or mass density to apply the force (e.g., a relatively light solid article that deforms under force). In some embodiments, during the applying of the force the flatness tolerance of the solid surface decreases by a factor of at least 1.5, at least 2, at least 5, or more relative to the flatness tolerance of the solid surface in the absence of the applied force. In some cases, during the applying of the force the flatness tolerance of the solid surface decreases by factor of up to 8, up to 10, or more. Combinations of these ranges are possible. For example, in some cases, during the applying of the force the flatness tolerance of the solid surface increases by a factor of at least 1.5 and up to a factor of 10.

In some embodiments, the absolute change in the flatness tolerance for a solid surface is relatively large during the application of the force via the solid surface. Such a change in flatness tolerance indicates a relatively large deformation of the solid surface (e.g., such that the solid surface becomes more flat). In some embodiments, during the applying of the force the flatness tolerance of the solid surface changes by at least 0.1 mm, at least 0.5 mm, at least 1 mm, or at least 5 mm relative to the flatness tolerance of the solid surface in the absence of the applied force. In certain embodiments, during the applying of the force, the flatness tolerance changes by up to 1 cm, up to 2 cm, up to 5 cm, or more from before the force is applied to after the force is applied relative to the flatness tolerance of the solid surface in the absence of the applied force.

In some embodiments, the solid surface is part of a solid article. For example, referring again to FIGS. 1A-1B, 3, and 4A-4B, solid surface 115 is part of solid article 110, according to certain embodiments. In some cases, embodiments are directed to a device comprising a solid article that comprises a solid surface via which a force is applied to a side of the electrochemical device. For example, FIGS. 3 and 4A-4B illustrate a front view of device 100 comprising solid article 110, with solid article 110 comprising solid surface 115, according to certain embodiments. In some cases, applying the force to the side of the electrochemical device may comprise applying a load to a solid article such that a force is applied to the electrochemical device via a solid surface of the solid article. For example, referring to FIG. 4A, applying a force to side 205 of electrochemical device 200 may comprise applying a load to solid article 110 such that solid article 110 and consequently solid surface 115 deform under the load as the resulting force is applied via solid surface 115 to side 205 of electrochemical device 200.

In some embodiments, the solid article (e.g., that is part of a device configured to apply a force to an electrochemical device) comprises any suitable solid material. In some embodiments, the solid article is or comprises a metal, metal alloy, composite material, or a combination thereof. In some cases, the metal that the solid article is or comprises is a transition metal. For example, in some embodiments, the solid article is or comprises Ti, Cr, Mn, Fe, Co, Ni, Cu, or a combination thereof. In some embodiments, the solid article is or comprises a non-transition metal. For example, in some embodiments, the solid article is or comprises Al, Zn, or combinations thereof. Exemplary metal alloys that the solid article can be or comprise include alloys of aluminum, alloys of iron (e.g., stainless steel), or combinations thereof. Exemplary composite materials that the solid article can be or comprise include, but are not limited to, reinforced polymeric, metallic, or ceramic materials (e.g., fiber-reinforced composite materials), carbon-containing composites, or combinations thereof. In some embodiments, the composite material is or comprises a carbon-fiber material.

In some embodiments, the solid article comprising the solid surface (e.g., convex surface) comprises a polymeric material (e.g., an organic polymeric material). In some such embodiments, the solid article comprises a polymeric material (e.g., an organic polymeric material) in an amount of greater than or equal to 25 weight percent (wt %), greater than or equal to 50 wt %, greater than or equal to 75 wt %, greater than or equal to 90 wt %, greater than or equal to 95 wt %, greater than or equal to 99 wt %, or up to 100 wt %. Example of suitable polymeric materials include, but are not limited to, acrylonitrile butadiene styrene, polylactic acid, polyamide, polyether ether ketone, Nylon, polycarbonate, polyetherimide resin, or combinations thereof. A solid article comprising a polymeric material may be relatively inexpensive to fabricate and may deform relatively easily compared to other types of materials.

The solid article may have any of a variety of suitable elastic moduli. The elastic modulus of the solid article may be high enough such that it can adequately hold its shape. In some embodiments, the solid article has an elastic modulus of greater than or equal to 10 MPa, greater than or equal to 50 MPa, greater than or equal to 100 MPa, greater than or equal to 200 MPa, greater than or equal to 500 MPa, greater than or equal to 1 GPa, greater than or equal to 2 GPa, greater than or equal to 5 GPa, greater than or equal to 10 GPa, greater than or equal to 20 GPa, greater than or equal to 50 GPa, greater than or equal to 100 GPa, greater than or equal to 200 GPa, or greater. In some embodiments, the solid article comprising the solid surface has an elastic modulus of less than or equal to 800 GPa, less than or equal to 760 GPa, less than or equal to 500 GPa, less than or equal to 400 GPa, less than or equal to 300 GPa, less than or equal to 250 GPa, less than or equal to 200 GPa, less than or equal to 150 GPa, less than or equal to 100 GPa, less than or equal to 75 GPa, less than or equal to 50 GPa, less than or equal to 25 GPa, less than or equal to 10 GPa, less than or equal to 5 GPa, or lower). Combinations of these ranges are possible (e.g., greater than or equal to 10 MPa and less than or equal to 800 GPa, greater than or equal to 1 GPa and less than or equal to 250 GPa). Materials having a low elastic modulus tend to deform under a given load more than materials having a high elastic modulus.

In certain cases, the solid article is or comprises a material that has a relatively low mass density. For example, in some embodiments, the solid article is or comprises a metal, metal alloy, or composite that comprises aluminum. In some cases, aluminum is present in the solid article in a relatively high amount. For example, in some embodiments, aluminum is present in a weight percentage of at least 10%, at least 25%, at least 50%, at least 75%, at least 90%, at least 95%, at least 95%, or 100%. Having a relatively low mass density can be useful in some (but not necessarily all) cases in which it is desirable for the system comprising the device configured to apply the force and the electrochemical device to have a relatively high energy density (e.g., gravimetric energy density). Use of the methods and devices described herein (e.g., involving the use of solid surfaces that are convex in the absence of an applied force) can, in some cases, allow for relatively large magnitudes of forces to be applied to the electrochemical device while using a solid article with a relatively low mass density without causing deleterious results such as relatively non-uniform distributions of utilization of electrode active material (e.g., due to a relatively non uniform pressure distribution).

In some embodiments, the solid article is or comprises a solid plate. For example, referring to FIG. 1A, in some embodiments, solid article 110 is a solid plate. It should be understood that the surfaces of a solid plate do not necessarily need to be flat. For example, one of the sides of the solid plate may comprise the solid surface via which a force is applied to the electrochemical device, and that surface may be curved (e.g., convex) in the absence of an applied force. In some embodiments, no surfaces of the solid plate is flat in the absence of a force. In some cases, no surfaces of the solid plate is flat under at least one magnitude of applied force.

In certain cases, the solid article is not a solid plate. For example, in some cases, the solid surface and other components of a containment structure configured to house the electrochemical device are part of a unitary structure. For example a unitary containment structure, in some cases, comprises an interior surface, at least a portion of which is convex with respect to a side of the electrochemical device one electrochemical device is housed within the containment structure, in the absence of the applied force.

Figure 5A:
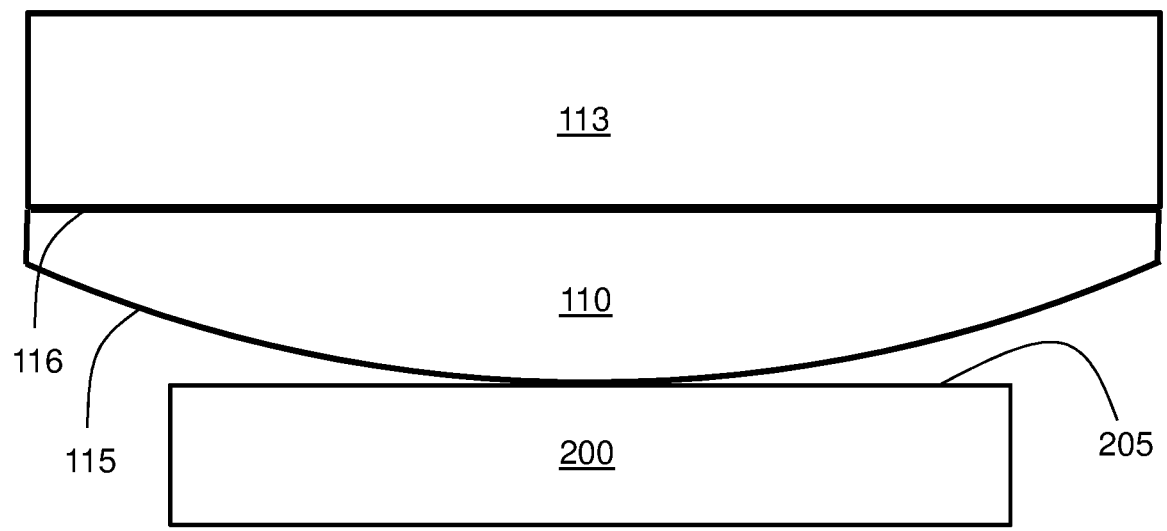
FIG. 5A shows a schematic illustration of a front view of an exemplary electrochemical device, a solid article comprising a solid surface, and a distal solid article, in the absence of an applied force, according to certain embodiments.
Figure 5B:
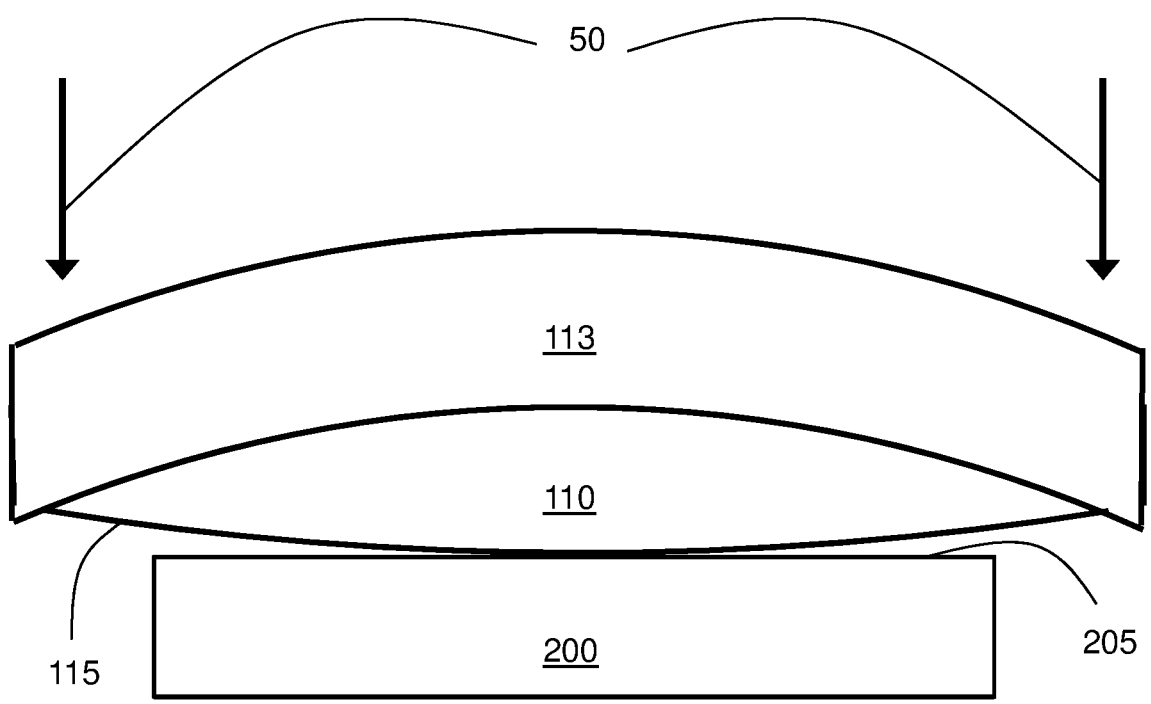
FIG. 5B shows a schematic illustration of a front view of an exemplary electrochemical device, a solid article comprising a solid surface, and a distal solid article, with a force being applied, according to certain embodiments.

The solid article comprising the solid surface can be in contact with other solid articles. In some embodiments, a distal solid article is adjacent to a side of the solid article opposite the solid surface. FIGS. 5A-5B show schematic front view illustrations of one such embodiment. In FIG. 5A, solid article 110 comprises solid surface 115, at least a portion of which is convex with respect to side 205 of electrochemical device 200 before a force has been applied. In this embodiment, solid article 110 is adjacent to distal solid article 113. Distal solid article 113 is adjacent to side 116 of solid article 110, which is opposite of solid surface 115.

It has been observed in the context of this disclosure that in some instances, application of force via multiple solid articles (e.g., a solid article comprising a shaped solid surface and an adjacent distal solid article) promotes easier and less expensive manufacture and greater flexibility in design compared to application of force via a single solid article comprising the solid surface. For example, the solid article comprising the solid surface (e.g., a contoured solid surface) and the distal solid article may be designed and fabricated independently, providing fewer manufacturing constraints. Moreover, in some embodiments the solid comprising the solid surface may be relatively small, while the majority of the solid material via which force is applied may be the distal solid article lacking the solid surface. The distal solid article can be in the form of a simple, regularly-shaped non-contoured object. As a result, only a relatively small amount of material (the solid article comprising the solid surface) may need to be subjected to shaping (e.g., such that at least a portion of the solid surface is convex). This can lead to less expensive manufacturing than in the case of a single solid article. The distal solid article may be a solid plate (e.g., a flat plate).

FIGS. 5A-5B illustrate application of force to a side of an electrochemical device via multiple solid articles, according to certain embodiments. In some embodiments, applying force 50 to side 205 of electrochemical device 200 via solid surface 115 of solid article 110 causes solid surface 115 to deform such that solid surface 115 is less convex (as shown in FIG. 5B) than it is in the absence of applied force 50 (as shown in FIG. 5A). Upon application of force via the solid article, the distal solid article may bear the load, while the solid article comprising the solid surface may affect the resulting pressure distribution experienced by the electrochemical device. In some embodiments, the solid surface of the solid article deforms (e.g., becomes less convex, becomes flatter), while the distal solid article also deforms (e.g., bends). For example, referring to FIG. 5B, application of force 50 causes deformation of solid surface 115 of solid article 110 (making it less convex), while distal solid article 113 also undergoes bending.

In some embodiments, a solid article comprising the solid surface (e.g., solid article 110) and a distal solid article (e.g., distal solid article 113) are attached to each other (e.g., via welding, via an adhesive, via a fastener). A person of ordinary skill in the art would be able to distinguish between two separate solid articles that are adhered to each other (in which case, there are two distinguishable domains whose volumes do not overlap with each other) and traditional composite articles (where the two materials are intermingled such that their domains overlap). In some embodiments, the solid article comprising the solid surface and a distal solid article are not attached but are kept together via an applied force (e.g., when a device described herein is assembled via one or more couplings).

The solid article comprising the solid surface and the distal solid article may be independently made of any of the materials described above in the context of the solid article. For example, the solid article and/or the distal solid article may comprise a metal (e.g., aluminum), metal alloy (e.g., stainless steel), composite material (e.g., carbon fiber), polymeric material, or a combination thereof. In some embodiments the solid article and the distal solid article are made of the same material or combinations of materials, while in other embodiments the solid article and the distal solid article are made of different materials or combinations of materials.

In some embodiments, the solid article comprising the solid surface has a relatively low elastic modulus (e.g., less than or equal to 75 GPa and/or as low as 10 MPa) and the distal solid article has a relatively high elastic modulus (e.g., greater than or equal to 100 GPa and/or up to 800 GPa). One example of such an embodiment is where the solid article comprises a polymeric material and the distal solid article comprises a composite comprising carbon fiber (e.g., a carbon fiber solid plate).

Figure 5C:
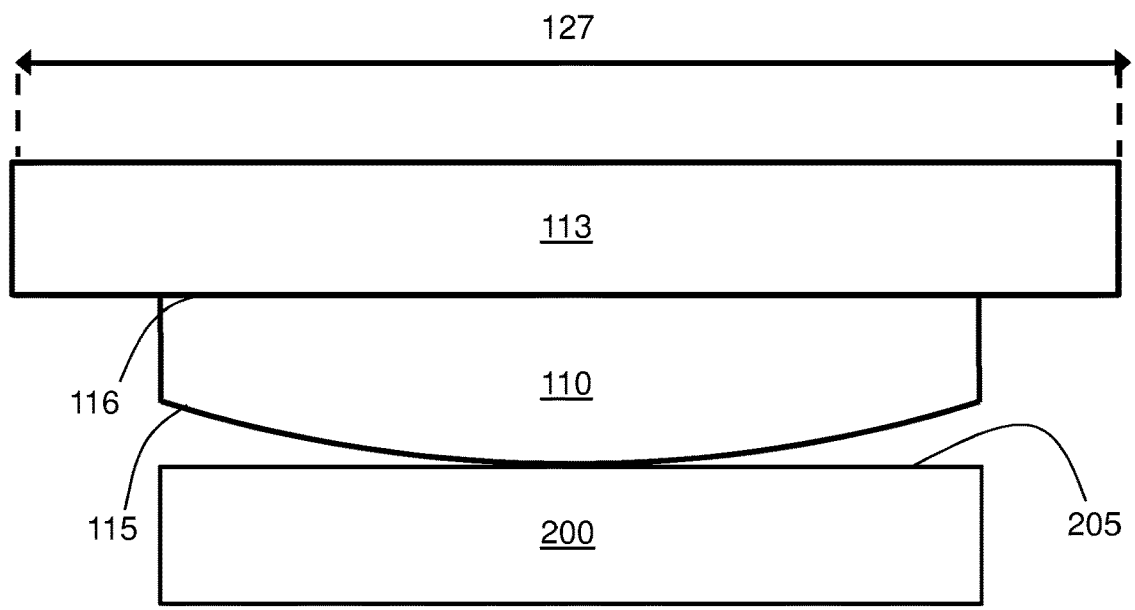
FIG. 5C shows a schematic illustration of a front view of an exemplary electrochemical device, a solid article comprising a solid surface, and a distal solid article having a maximum lateral geometric area greater than the area of the solid surface, in the absence of an applied force, according to certain embodiments.
Figure 5D:
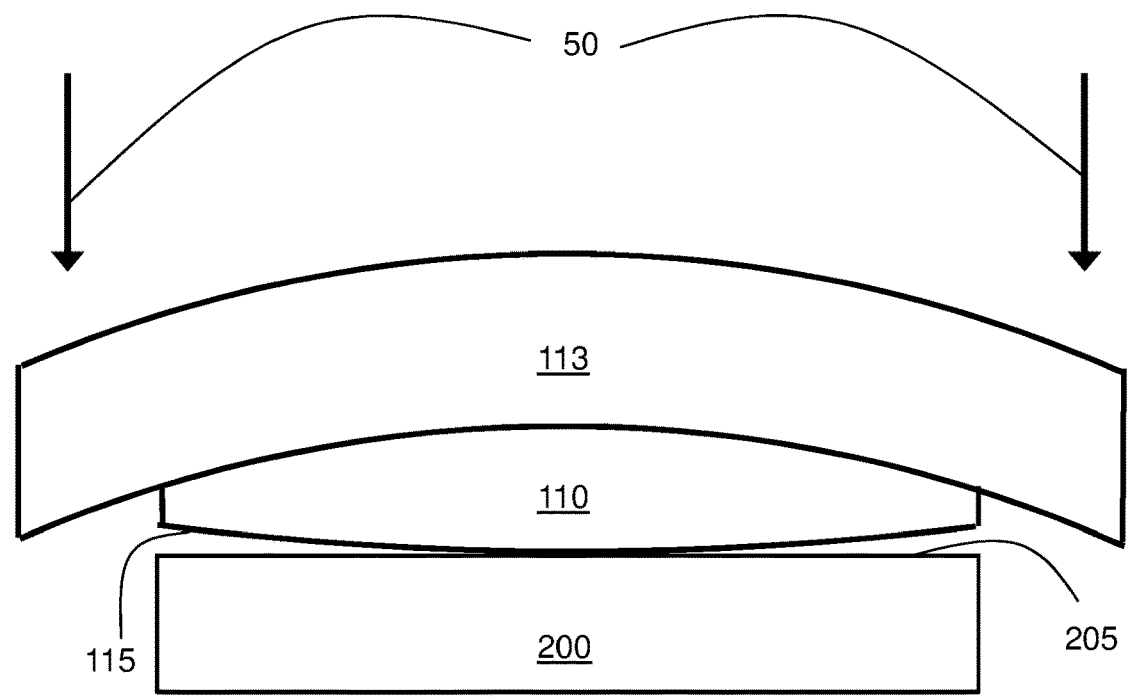
FIG. 5D shows a schematic illustration of a front view of an exemplary electrochemical device, a solid article comprising a solid surface, and a distal solid article having a maximum lateral geometric area greater than the area of the solid surface, with a force being applied, according to certain embodiments.

In some embodiments, the solid surface via which a force is applied to the electrochemical cell has a geometric area smaller than a maximum lateral geometric area of the distal solid article. For example, FIGS. 5C-5D show schematic front view illustrations of solid article 110 comprising solid surface 115 via which a force is applied to side 205 of electrochemical device 200. Solid article comprises solid surface 115. Distal solid article 113 is adjacent to side 116 of solid article 110 that is opposite to solid surface 115. Distal solid article 113 has a maximum lateral geometric area corresponding to a cross-section in a plane parallel to maximum lateral dimension 127, in accordance with certain embodiments. In some embodiments, as shown in FIGS. 5C-5D, solid surface 115 has a geometric area smaller than the maximum lateral geometric area corresponding to a cross-section in a plane parallel to maximum lateral dimension 127. In some embodiments, applying force 50 to side 205 of electrochemical device 200 via solid surface 115 of solid article 110 causes solid surface 115 to deform such that solid surface 115 is less convex (as shown in FIG. 5D) than it is in the absence of applied force 50 (as shown in FIG. 5C).

The solid surface may have a geometric area that is less than or equal to 90% (or less than or equal to 75%, less than or equal to 50%, less than or equal to 25%, or less) of the area of a maximum lateral geometric area of the distal solid article.

In some embodiments, the solid surface (e.g., convex surface) has an area greater than or equal to an area of the side of the electrochemical device to which it applies a force. In certain such instances, the solid surface has an area greater than or equal to an area of the side of the electrochemical device to which it applies a force but smaller than a maximum lateral geometric area of the distal solid article.

The solid article may have any suitable dimension. For example, the thickness of the solid article may be chosen such that the thickness is small enough such that the solid article is not so heavy as to make the energy density of the system unacceptably low, but high enough such that the solid article can withstand an applied load (e.g., during the applying of the force to the electrochemical device). In some embodiments, the solid article has a maximum thickness of greater than or equal to 1 mm, greater than or equal to 5 mm, greater than or equal to 1 cm, or greater. In some cases, the solid article has a maximum thickness that is less than or equal to 5 cm, less than or equal to 2 cm, or less. Combinations of these ranges are possible. For example, in some embodiments, the solid article is a maximum thickness that is greater than or equal to 1 mm and less than or equal to 5 cm.

The solid article may have any suitable aspect ratio. In certain cases, a solid article with a relatively large aspect ratio can be useful for applying a force to a relatively large amount of the electrochemical device while comprising a relatively small amount of material, which can contribute to a relatively high energy density for the system. In certain cases, having a relatively high aspect ratio for the solid article contributes, at least in part, to the extent to which the solid article deforms under a load. In some embodiments, there is a relatively large ratio of a lateral dimension of the solid article to the maximum thickness of the solid article. For example, referring again to FIG. 1A, in some embodiments, solid article 110 has lateral dimension 127 and maximum thickness 123, and the ratio of lateral dimension 127 to thickness 123 is relatively large. In some embodiments, the ratio of at least one lateral dimension of the solid article to the maximum thickness of the object in the absence of an applied force is greater than or equal 1, greater than or equal to 2, greater than or equal to 5, greater than or equal to 10, greater than or equal to 50, greater than or equal to 100, or more. In some embodiments, the ratio of at least one lateral dimension of the solid article to the maximum thickness of the object in the absence of an applied force is less than or equal to 1000, less than or equal to 500, less than or equal to 200, or less. Combinations of these ranges are also possible. For example, in some embodiments, the ratio of at least one lateral dimension of the solid article to the maximum thickness of the object in the absence of an applied force is at least 1 and less than or equal to 1000.

In some embodiments, the ratio of all lateral dimensions of the solid article to the maximum thickness of the object in the absence of an applied force is greater than or equal 1, greater than or equal to 2, greater than or equal to 5, greater than or equal to 10, greater than or equal to 50, greater than or equal to 100, or more. In some embodiments, the ratio of all lateral dimensions of the solid article to the maximum thickness of the object in the absence of an applied force is less than or equal to 1000, less than or equal to 500, less than or equal to 200, or less. Combinations of these ranges are possible. For example, in some embodiments, the ratio of all lateral dimensions of the solid article to the maximum thickness of the object in the absence of an applied force is at least 1 and less than or equal to 1000.

In some embodiments in which a force is applied to a side of an electrochemical device via a solid surface as described above, a second solid surface is proximate to a second side of the electrochemical device. In some cases, the second surface is also convex with respect to the second side of the electrochemical device in the absence of an applied force, but there is at least one magnitude of applied force under which the second surface becomes less convex.

In certain cases in which a force is applied to a side of an electrochemical device via a solid surface, the side of the electrochemical device is a first side, the solid surface is a part of a first solid article, the electrochemical device comprises a second side, and at least a portion of a second solid surface of a second solid article is proximate to the second side of the electrochemical device. For example, referring to FIG. 4A, in some embodiments, device 100 comprising first solid surface 115, which is part of first solid article 110, is configured to apply a force to first side 205 of electrochemical device 200, and device 100 further comprises optional second solid article 120 proximate second side 207 of electrochemical device 200. In some cases, the second solid article has the same composition as the first solid article, while in other cases the second solid article has a different composition as the first solid article. The second solid article can have the same shape as the first solid article in the absence of an applied force, or a different shape in the absence of an applied force. In some embodiments, the second solid article is or comprises a solid plate. For example, referring to FIG. 3, in certain embodiments, second solid article 120 is a solid plate. In some embodiments, the second solid article is made in contact with other solid articles. In some embodiments, a second distal solid article is adjacent to a side of the second solid article opposite the second solid surface (e.g., convex surface).

In some embodiments, the second solid surface of the second solid article proximate to the second side of the electrochemical device has a convexity that is less than the convexity of the second solid surface of the second solid article when the applied force is removed. In some embodiments, the device comprises a second solid surface (e.g., as part of a second solid article) proximate to the second side of the electrochemical device that is convex with respect to the second side of the electrochemical device in the absence of an applied force, and applying the force to the electrochemical device causes the second solid article to deform such that second solid surface becomes less convex. Referring again to FIGS. 4A and 4B, for example, in some embodiments, second solid surface 125 of second solid article 120 proximate to second side 207 of electrochemical device 200 has a convexity in the absence of an applied force (as shown in FIG. 4A), and when force 50 is applied (as shown in FIG. 4B), second solid surface 125 of second solid article 120 becomes less convex.

In certain cases in which the device configured to apply a force to an electrochemical device comprises a first solid article comprising a first solid surface and a second solid article comprising a second solid surface, the first solid article has a first shape that, in the absence of an applied force, is convex with respect to the second solid surface. For example, referring to FIG. 3, device 100 comprises first solid article 110 comprising first solid surface 115, and device 100 also comprises second solid article 120 comprising a second solid surface 125, according to certain embodiments. In some embodiments, first solid article 110 has a first shape that is convex with respect to second surface 125 of second solid article 120 in the absence of an applied force. For example, first solid article 110 in FIG. 3 has a shape such that first solid surface 115 curves away from second solid article 120 in the absence of an applied force. In some embodiments, under at least one magnitude of applied force, the first solid surface has a second shape that is less convex than the first shape with respect to the second solid surface. Inclusion of electrochemical device 200 within device 100 may result in system 300, as shown in FIG. 4A according to certain embodiments. In some embodiments, as shown in FIG. 4B, first solid article 110 has a second shape when force 50 is applied, with that second shape of first solid article 110 being less convex (e.g., first solid surface 115 is less convex) with respect to second solid surface 125 of second solid article 120 than when force 50 is not applied.

In some embodiments, the device configured to apply a force to the electrochemical device comprises a first solid article comprising a first solid surface and a second solid article comprising a second solid surface, where the first solid surface is not substantially parallel to the second solid surface in the absence of an applied force. A first solid surface is not substantially parallel to a second solid surface, for example, if any plane tangent to the first solid surface is not substantially parallel to all planes tangent to the second solid surface. In some embodiments, two surfaces can be substantially parallel if, for example, the maximum angle defined by the two planes is less than or equal to 10°, less than or equal to 5°, less than or equal to 2°, or less than or equal to 1°. In some cases, under at least one magnitude of force, the first solid article and/or the second solid article deforms such that the first solid surface becomes substantially parallel to the second surface.

One such exemplary case of the device where the first solid surface is not substantially parallel to the second solid surface is the case where the first solid surface is convex with respect to the second solid article, as described above and illustrated according to certain embodiments in FIG. 3. However, it should be understood that the first solid surface of the first solid article and/or the second surface of the second solid article need not necessarily be convex (or comprise a portion that is convex e.g., with respect to the side of electrochemical device when present) even in the absence of an applied force. For example, in some embodiments, the thickness of the first solid article varies linearly such that the first solid surface is sloped with respect to the second solid surface (e.g., a wedge-like first solid article). Upon the application of at least one magnitude of force, the sloped first solid surface may deform such that it becomes substantially parallel to the second solid surface. In some cases, the shape of the first solid article and the first solid surface (and/or the second solid article and the second solid surface) is selected such that when a force is applied to an electrochemical device, a relatively uniform utilization of electrode active material is achieved during cycling, and in certain cases the selected shape is not a shape that is convex with respect to the side of the electrochemical device when present and/or the other solid article of the device.

In some embodiments, the magnitude of the force applied to the side of the electrochemical device is relatively large. Applying a relatively large force to the side of the electrochemical device can, in some cases, provide for a relatively large improvement in the performance of the electrochemical device (e.g., improved current density, decreased surface roughening of lithium-containing anodes during cycling, etc.). In some cases, the applied force has a component normal to the active surface of at least one electrode of the electrochemical device. In some embodiments, the component of the applied force normal to the active surface of at least one electrode of the electrochemical device defines a pressure of at least 49, at least 78, at least 98, at least 117.6, at least 147, at least 175, at least 200, at least 225, or at least 250 Newtons per square centimeter. In some embodiments, the component of the applied force normal to the active surface of at least one electrode of the electrochemical device defines a pressure of less than or equal to 250, less than or equal to 225, less than or equal to 196, less than 147, less than or equal to 117.6, or less than or equal to 98 Newtons per square centimeter. In some embodiments, the component of the applied force normal to the active surface of at least one electrode of the electrochemical device defines a pressure of between 49 and 147 Newtons per square centimeter, between 49 and 117.6 Newtons per square centimeter, between 68.6 and 98 Newtons per square centimeter, between 78 and 108 Newtons per square centimeter, between 49 and 250 Newtons per square centimeter, between 80 and 250 Newtons per square centimeter, between 90 and 250 Newtons per square centimeter, or between 100 and 250 Newtons per square centimeter. The force or pressure may, in some embodiments, be externally-applied to the cell via a solid surface, as described herein. While forces and pressures are generally described herein in units of Newtons and Newtons per unit area, respectively, forces and pressures can also be expressed in units of kilograms-force (kgf) and kilograms-force per unit area, respectively. One of ordinary skill in the art will be familiar with kilogram-force-based units, and will understand that 1 kilogram-force is equivalent to 9.8 Newtons. The use of the methods, devices, and systems described herein may, in some cases, provide for an ability to apply relatively large magnitudes of force to the electrochemical device while still maintaining a relatively uniform distribution of utilization of electrode active material, while applying the force via relatively light (but perhaps deformable) objects (e.g., relatively lightweight solid articles).

Applying a force to a side of electrochemical device (e.g., via a solid surface that is convex with respect to the side of the electrochemical device in the absence of an applied force and/or becomes more flat when the force is applied) can be performed in a variety of ways. For example, in some embodiments, the electrochemical device is located between two solid articles (e.g., the first solid article comprising the first solid surface and the second solid article comprising the second solid surface), as shown in FIG. 4A. An object (e.g., a machine screw, a nut, a spring, etc.) may be used to apply the force by applying pressure to the ends (or regions near the ends) of the electrochemical device. In the case of a machine screw, for example, the electrochemical device may be compressed between the plates upon rotating the screw. As another example, in some embodiments, one or more wedges may be displaced between the device configured to apply the force (e.g., a containment structure surrounding the cell comprising the solid article) and a fixed surface (e.g., a tabletop, the inside surface of another containment structure, etc.). The force may be applied by driving the wedge between the containment structure (e.g., between a solid article of the containment structure) and the adjacent fixed surface through the application of force on the wedge (e.g., by turning a machine screw).

In some embodiments, the force may be applied using compression springs. For example, referring to FIG. 4B, electrochemical device 200 may be situated in optional enclosed containment structure 350 with one or more compression springs situated between first solid article 110 and an adjacent wall of optional containment structure 350 to produce a force with a component in the direction of arrow 50 to electrochemical device 200. In some embodiments, the force may be applied by situating one or more compression springs outside the containment structure such that the spring is located between an outside surface of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, and/or weights, among others.

Some embodiments are directed to the use of a coupling to apply the force via the solid surface, wherein the coupling is configured to perform well even in cases where an object interfacing with the coupling (e.g., a solid article) deforms during the application of the force. For example, some embodiments involve applying a force to a solid article that is proximate to an electrochemical device such that a solid surface of the solid article is deformed, wherein the application of the force is performed via a coupling. As such, in some embodiments, the device configured to apply a force to a side of electrochemical device comprises a coupling connecting a first solid article to a second solid article. For example, referring to FIG. 3, in some embodiments, device 100 comprises coupling 130. In some cases, coupling 130 spans from first solid article 110 comprising first solid surface 115 to optional second solid article 120. Referring now to FIG. 4A, in some embodiments, applying a force to side 205 of electrochemical device 200 is performed by applying a force to first solid article 110 using coupling 130. In some embodiments, the device configured to apply a force to a side of the electrochemical device has more than one coupling. In certain cases, the device includes at least 2 couplings, at least 4 couplings, and/or up to 8 couplings or more.

In some embodiments, the coupling comprises a surface portion in contact with an exterior surface opposite the solid surface of the solid article. In some embodiments, the coupling comprises a surface portion in contact with an exterior surface of the solid article. For example, referring to FIG. 3, coupling 130 comprises surface portion 132 in contact with exterior surface 111 of first solid article 110. The surface portion may be or be part of, for example, a washer or a compression bar/rod. In certain cases, applying a force to the solid article (e.g., such that the solid article is deformed) is performed by causing the surface portion of the coupling in contact with an exterior surface of the solid article to apply a pressure to the exterior surface of the solid article (e.g., by tightening a nut or machine screw coupled to the coupling). In some embodiments, the solid article is a first solid article, the surface portion of the coupling that is in contact with an exterior surface of the first solid article is a first surface portion, and the coupling comprises a second solid portion in contact with an exterior surface of the second solid article.

As indicated above exterior surface may be a part of the solid article itself. In some embodiments, a contour of the surface portion of the coupling interfaces with a contour of the exterior surface of the solid article. For example, referring to FIG. 3, exterior surface 111 of first solid article 110 comprises contour 112, which is coupled to contour 133 of surface portion 132 of coupling 130, according to certain embodiments. In some cases, a contour of a surface is a curved protrusion from the surface, while in certain cases a contour of a surface is a curved depression in the surface. In some embodiments, the contour of the surface portion of the coupling interfaces with the contour of the exterior portion of the solid article. In some embodiments in which a distal solid article is adjacent to a side of the solid article opposite the solid surface, a contour of the surface portion of the coupling interfaces with the contour of the exterior portion surface of the distal solid article that is opposite the solid surface of the solid article. It should be understood that in some cases the contour of the surface portion of the coupling is in direct contact with the contour of the exterior surface of the solid article with which it is interfacing. However, in certain cases, one or more intervening layers or substances may be between the contour of surface portion of the coupling and the contour of the exterior surface of the solid article. For example, in some embodiments, a lubricant (e.g., a solid lubricant, a liquid lubricant) is between the contour of the surface portion of the coupling and the contour of the exterior surface of the solid article with which it is interfacing.

While in some embodiments the exterior surface having the contour and opposite the solid surface is part of the solid article comprising the solid surface, in some embodiments the exterior surface is part of a distal solid article (e.g., a solid plate). The description above and below describing configurations and interfacings of couplings and an exterior surface of the solid article are also applicable to embodiments in which exterior surface is instead a part of the distal solid article.

In some embodiments, at least a portion of the contour of the surface portion of the coupling is complementary with the contour of the exterior surface opposite the solid surface. As mentioned above, the exterior surface may be part of the solid article. For example, referring to FIG. 3, at least a portion of contour 133 of surface portion 132 of coupling 130 is complementary with contour 112 of exterior surface 111 of solid article 110. It should be understood that a first contour and a second contour need not be perfectly geometrically complementary to be considered complementary.

In some embodiments, deforming a solid surface of a solid article by applying a force to the solid article using the coupling causes relative rotational motion between the contour of the exterior surface opposite the solid surface of the solid article and the contour of the surface portion of the coupling that interfaces with the contour of the exterior surface opposite the solid surface. Such relative rotation between the contours can be seen in FIG. 4B. In FIG. 4B, deformation of solid article 110 caused by the application of force 50 via a coupling 130 causes relative rotational motion between contour 112 of exterior surface 111 of first solid article 110 and contour 133 of surface portion 132 of coupling 130, as illustrated by double arrow 60. Having relative rotational motion between the contours can, in some cases, improve the performance of a device configured to apply force to an electrochemical device by avoiding deformation, torque, and/or bending of the coupling that could occur due to deformation of the solid article in the absence of relative rotational motion between the contour of the surface portion of the coupling and the contour the exterior surface of the solid article. Limiting deformation or bending of the coupling that spans the first solid article and the second solid article during the application of the force may, in some cases, allow for the desired pressure distribution to be achieved on the electrochemical device, and/or provide for a relatively uniform utilization of electrode active material during cycling of the electrochemical device. For example, in some cases, relative rotational motion between a contour of the surface portion of the coupling and the contour of the exterior surface opposite the solid surface of the solid article can help maintain tension in the coupling in the direction normal to the side of the electrochemical device, even as the solid article(s) is deformed during the application of the force.

In some embodiments, the coupling comprises a fastener interfacing with the surface portion of the coupling. Referring to FIG. 3, in some embodiments, coupling 130 comprises fastener 134 interfacing with surface portion 132. It should be understood that in some embodiments, the surface portion of the coupling and the fastener of the coupling are not unitary components of the coupling, but are rather separate solid components of the coupling. In some embodiments, relative motion between the surface portion of the coupling and the fastener is possible. For example, referring again to FIG. 3, fastener 134 may travel through a hole or void in surface portion 132 of coupling 130 and the position of surface portion 132 may be adjustable with respect to fastener 134 (e.g., via a portion of fastener 134 sliding through the hole or void in surface portion 132). For example, surface portion 132 is closer to the center of fastener 134 in FIG. 4B than in FIG. 4A. In some cases, applying a force (e.g., to the first solid article, the second solid article, the electrical device, etc.) comprises causing relative motion between the surface portion of the coupling and the fastener of the coupling (e.g., by tightening a nut at an interface between the fastener and the surface portion of the coupling or, in cases where the fastener comprises a machine screw, by turning the machine screw). In some cases, the coupling comprises a single fastener. However, in certain embodiments, the coupling comprises more than one fastener. For example, in some cases, the coupling comprises at least 2 fasteners, at least 4 fasteners, and/or up to 8 fasteners, or more. In some cases in which the coupling comprises multiple fasteners, each of the fasteners is coupled to the same surface portion of the coupling.

The coupling can comprise any of a variety of suitable fasteners. Exemplary fasteners include, but are not limited to, a rod (e.g., a threaded rod, a rod with interlocking features), a bolt, a screw (e.g., a machine screw), a nail, a rivet, a tie, a clip (e.g., a side clip, a circlip), a band, or combinations thereof. In some embodiments, the fastener spans from the first solid article to the second solid article. For example, referring to FIG. 3, fastener 134 spans from first solid article 110 to second solid article 120, according to certain embodiments. In some embodiments, the fastener comprises a rod. In certain cases, the rod (e.g., a threaded rod) spans from the first solid article to the second solid article. In certain cases, other types of fasteners, such as bolts, screws or ties span form the first solid article to the second solid article.

In some embodiments, a contour of the exterior surface opposite the solid surface of the first solid article interfaces with a contour of the surface portion of the coupling such that, when the force is applied, the fastener experiences a bending moment that is smaller than the bending moment that the fastener would experience if the exterior surface and the surface portion of the coupling were flat but under otherwise identical conditions. For example, referring to FIG. 4B, in some embodiments, contour 133 of surface portion 132 of coupling 130 interfaces with contour 112 of exterior surface 111 of first solid article 110 (which is opposite solid surface 115) such that when force 50 is applied, fastener 134 experiences a bending moment that is smaller than fastener 134 would experience if the exterior surface 111 and surface portion 132 were flat (e.g., had a flat interface). As particular non-limiting example, in some cases in which fastener 134 comprises a rod, contour 133 of surface portion 132 of coupling 130 interfaces with contour 112 of exterior surface 111 of first solid article 110 such that when force 50 is applied, rod 134 experiences a bending moment that is smaller than rod 134 would experience if the exterior surface 111 and surface portion 132 were flat (e.g., had a flat interface).

One way in which the contour of the exterior surface opposite the solid surface of the first solid article can interface with the contour of the surface portion of the coupling such that the fastener experiences a smaller bending moment then if the exterior surface of the surface portion of the coupling were flat under the application of the force is by having the contours interface such that relative rotational motion occurs between the surface portion of the coupling and the exterior surface opposite the solid surface of the solid article, as described above. In cases in which the exterior surface of the surface portion of the coupling are flat, application of the force (e.g., by applying tension in the coupling) may cause the solid article to deform, with that deformation causing a torque to be experienced by the surface portion of the coupling due to the flat interface between the surface portion and the exterior surface (and consequent lack of relative rotational motion at that interface). The torque on the surface portion of the coupling may result in a bending moment in the fastener, which may be undesirable. Therefore, certain interfacing of a contour of the surface portion of the coupling to a contour of the exterior surface opposite the solid surface of the solid article can, in some cases, result in a smaller bending moment being experienced by the fastener upon deformation of the first solid article (e.g., due to relative rotational motion between the contour of the surface portion of the coupling and the contour the exterior surface opposite the solid surface of the first solid article). A comparison of the bending moments experienced by the fastener can be performed by applying an identical load to a device where the contour of the surface portion of the coupling interfaces the contour of the surface opposite the solid surface of the solid article in the manner described above and to an otherwise identical device but where the exterior surface opposite the solid surface of the first solid article and the surface portion of the coupling are flat, and measuring the bending moments experienced by each fastener using a strain gauge. Upon application of the identical force to each of the two devices, the degree to which the fastener experiences deflection (e.g., the degree to which the fastener deviates from its shape in the absence of the applied force) can be examined and compared for the two cases. The bending/deflection of the fastener can be determined by measuring the change in parallelism of the end faces of the fastener (e.g., the outer surfaces of the fastener heads). If a bending moment is experienced by the fastener, the two end faces of the fastener would become less parallel. The parallelism of two surfaces can be described and quantified using the methods described in ASME Y14.5 2009.

In some cases, use of the coupling described herein provides for a facile way to maintain tension in the coupling in a direction normal to the side of the electrochemical device when a force is applied to the side of the electrochemical device via the solid surface. In certain cases, the coupling maintains tension in a direction normal to the side of the electrochemical device even as the solid surface (e.g., the solid surface of the solid article) is deformed during the applying of the force. Maintaining tension in the coupling during the applying of the force to the side of the electrochemical device may, in certain cases, lead to better control of the resulting pressure experienced by the electrochemical device (e.g., during cycling), which may lead to a more uniform utilization of electrode active material across the electrochemical device.

In some embodiments, the contour of the surface portion of the coupling has a convexity. For example, contour 133 of surface portion 132, as pictured in the exemplary embodiment shown in FIG. 3, has a convexity because contour 133 curves away from the bulk of surface portion 132. In certain embodiments, the contour of the exterior surface opposite the solid surface of the first solid article has a concavity that interfaces with the convexity of the contour of the surface portion of the coupling. For example, referring again to the exemplary embodiment shown in FIG. 3, contour 112 of exterior surface 111 opposite solid surface 115 of first solid article 110 has a concavity because contour 112 curves into the bulk of the first solid article 110. In certain cases, the concavity of contour 112 of exterior surface 111 interfaces with the convexity of contour 133 of surface portion 132 of coupling 130. One non-limiting way in which a contour of the surface portion of the coupling may have a convexity and the contour of the exterior surface opposite the solid surface of the solid article may have a concavity interfacing with the convexity of the surface portion is by having the surface portion of the coupling have a cylindrical or pseudo-cylindrical shape while the exterior surface opposite the solid surface of the solid article has a depression that has a cylindrical or pseudo-cylindrical shape. For example, in some cases, FIG. 3 shows a front view of surface portion 132, which as a cylindrical or pseudo-cylindrical shape, and contour 112 defines a depression of first solid article 110 that has a cylindrical or pseudo-cylindrical shape that interfaces with the cylindrical or pseudo-cylindrical shape of surface portion 132. In certain embodiments, the contour of the exterior surface opposite the solid surface of the first solid article has a concavity, at least a portion of which is complementary with the convexity of the contour of the surface portion of the coupling.

Figure 8:
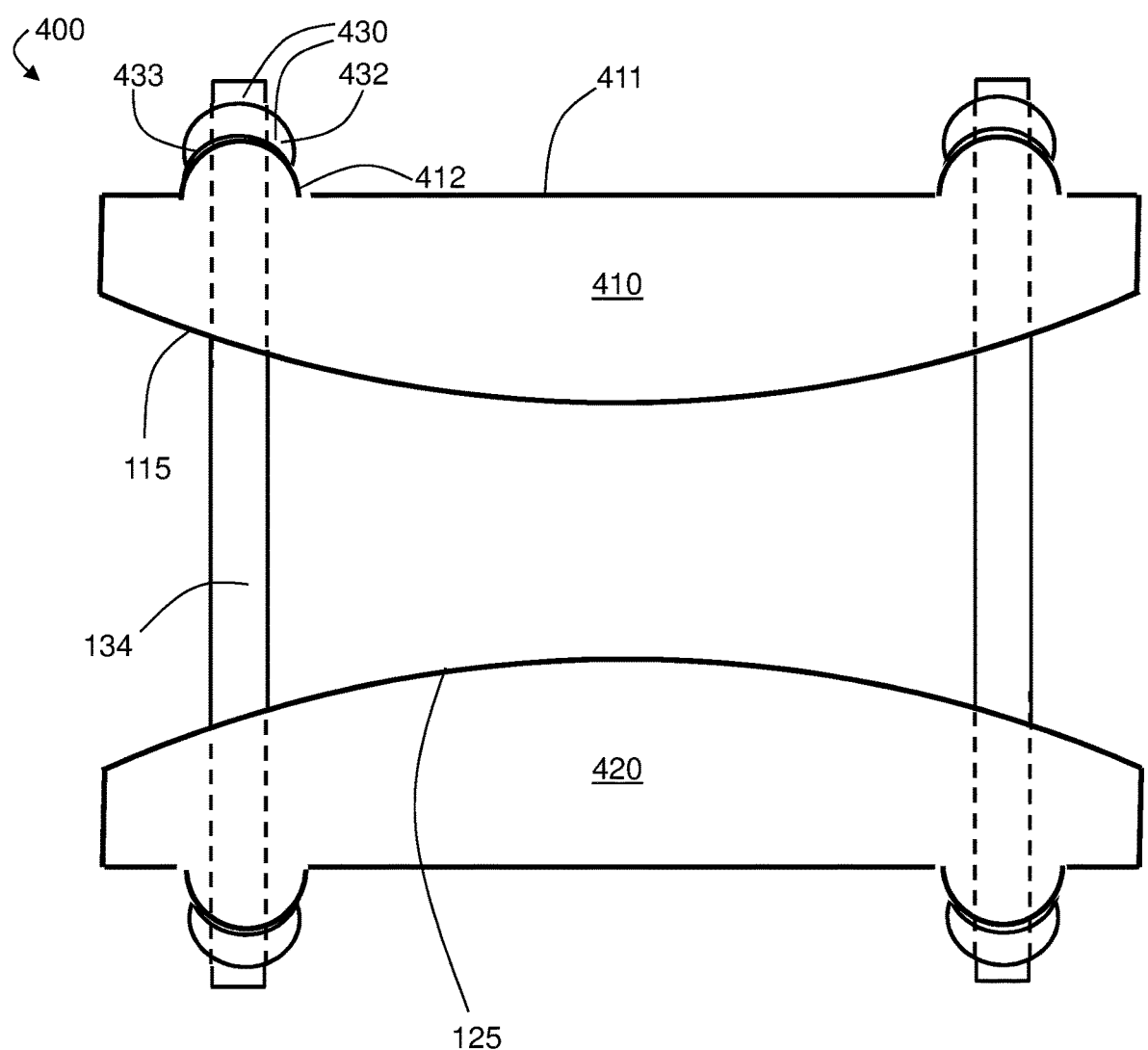
FIG. 8 shows a schematic illustration of a front view of an exemplary device for applying a force to the electrochemical device, according to certain embodiments.

In some embodiments, the contour of the surface portion of the coupling has a concavity. For example, referring to FIG. 8, device 400 comprises coupling 430 connecting the first solid article 410 to second solid article 420, and coupling 430 comprises surface portion 432, according to certain embodiments. In certain cases, surface portion 432 comprises contour 433, which has a concavity, because contour 433 curves into the bulk of surface portion 432. In some embodiments, the contour of the exterior surface opposite the solid surface of the solid article has a convexity that interfaces with the concavity of the surface portion of the coupling. Referring again to FIG. 8, contour 412 of exterior surface 411 opposite solid surface 115 of first solid article 410 has a convexity that interfaces with concavity of surface portion 432 of coupling 430. In certain cases, deformation of the first solid article (e.g., during the application of a force to the side of the electrochemical device) causes relative rotational motion between the contour of the surface portion of the coupling having a concavity and the contour opposite the solid surface of the exterior surface of the solid article having a convexity. In certain embodiments, the contour of the exterior surface opposite the solid surface of the first solid article has a convexity, at least a portion of which is complementary with the concavity of the contour of the surface portion of the coupling.

Figure 6:
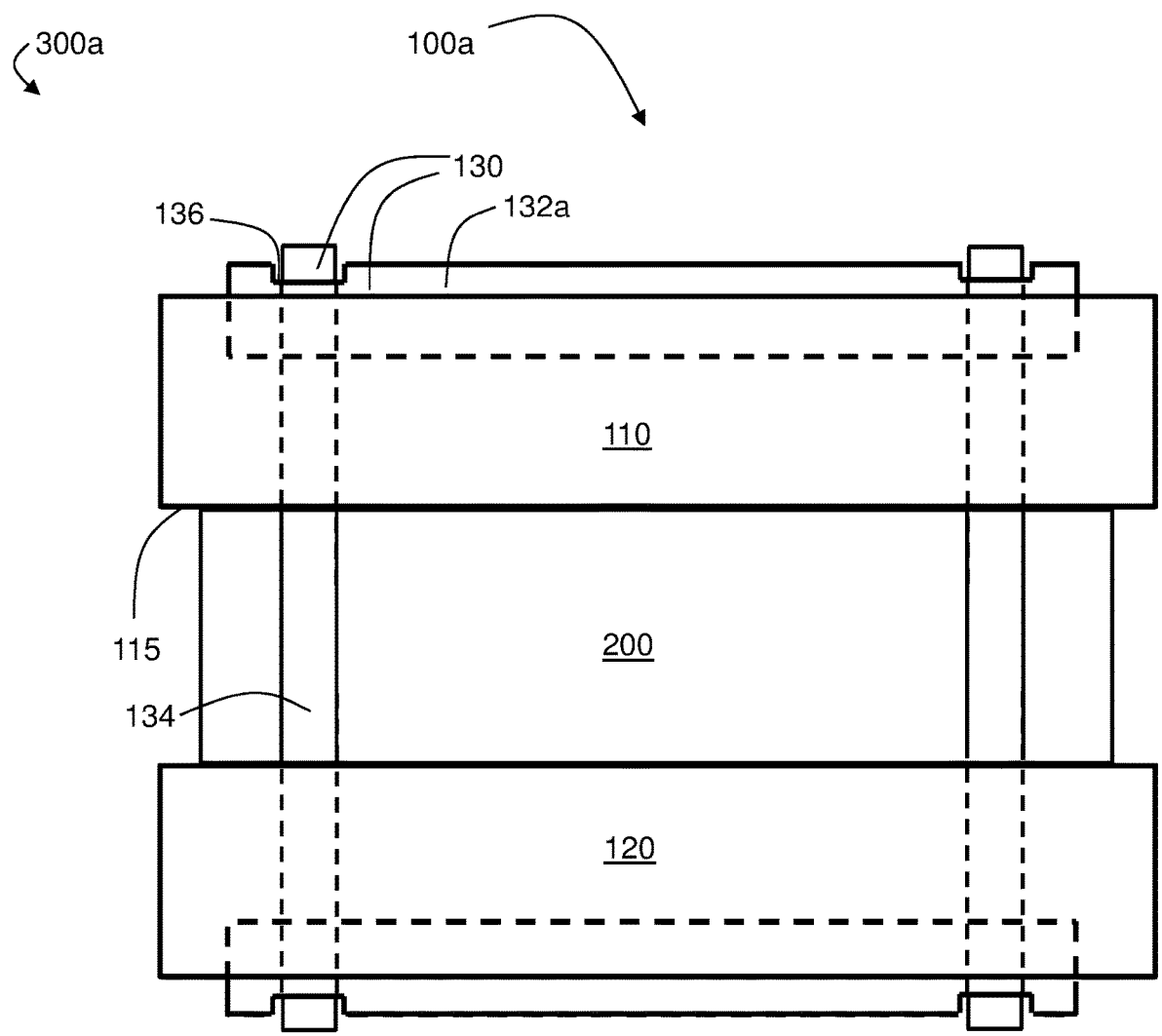
FIG. 6 shows a schematic illustration of a side view of an exemplary system comprising an electrochemical device and a device for applying a force to the electrochemical device, according to certain embodiments.
Figure 9A:
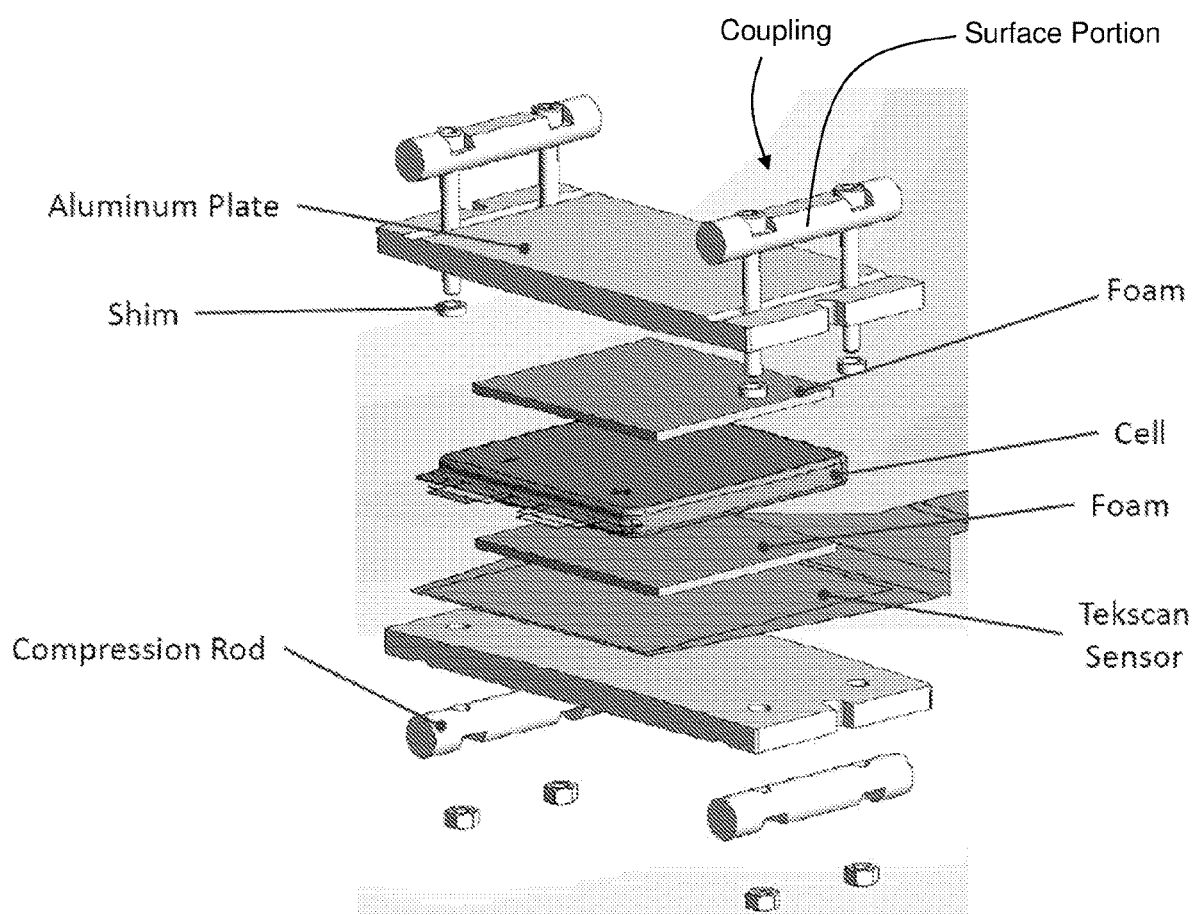
FIG. 9A shows an exploded illustration of an exemplary system comprising an electrochemical device and a device for applying a force to the electrochemical device, according to certain embodiments.

In some embodiments, the concavity is concave along a single axis. For example, in some cases in which the contour of the exterior surface of the solid article has a concavity, that concavity is concave along a single axis. For example, in some embodiments, the contour of the exterior surface defines a depression in the exterior of the solid article having a cylindrical or pseudo-cylindrical shape, with that cylindrical or pseudo-cylindrical shape being concave along the long axis of the cylinder or pseudo-cylinder. In some embodiments in which a distal solid article is employed, the contour of the exterior surface defines a depression in the exterior of the distal solid article having a cylindrical or pseudo-cylindrical shape, with that cylindrical or pseudo-cylindrical shape being concave along the long axis of the cylinder or pseudo-cylinder. In some such cases, the surface portion of the coupling that interfaces with the concavity that is concave along a single axis has a cylindrical or pseudo-cylindrical shape that couples to the concavity of the exterior surface. FIG. 6 shows a side-view schematic illustration of one such case, where system 300a comprises device 100a, and device 100a comprises surface portion 132a of coupling 130, in accordance a certain embodiments. FIG. 6 shows a side view of surface portion 132a, where surface portion 132a has a cylindrical or pseudo-cylindrical shape, according to certain embodiments. FIG. 9A shows one non-limiting view of a device having a coupling with a surface portion that is cylindrical or pseudo-cylindrical, along with an exterior surface of the solid article having a contour that has a concavity that is concave along a single axis.

Figure 7:
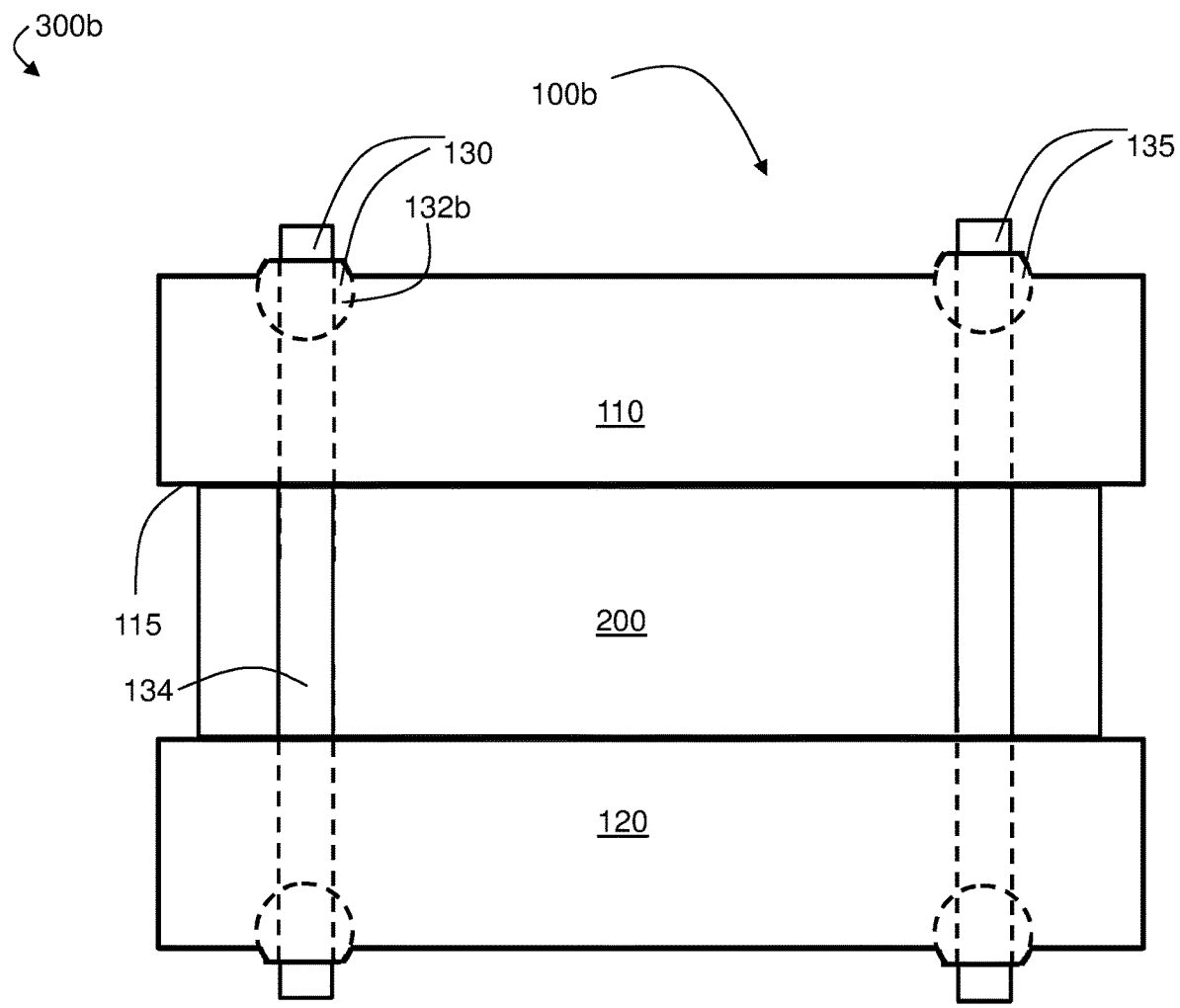
FIG. 7 shows a schematic illustration of a side view of an exemplary system comprising an electrochemical device and a device for applying a force to the electrochemical device, according to certain embodiments.

In some embodiments, the concavity is concave along two axes. For example, in some cases in which the contour of the exterior surface of the solid article has a concavity, that concavity is concave along two axes. As one non-limiting example, the contour of the exterior surface may define a depression in the exterior of the solid article having a spherical or pseudo-spherical shape. In some embodiments in which a distal solid article is employed, the contour of the exterior surface may define a depression in the exterior of the distal solid article having a spherical or pseudo-spherical shape. In some such cases, the surface portion of the coupling that interfaces with the concavity that is concave along two axes has a spherical or pseudo-spherical shape that interfaces with the concavity of the exterior surface. FIG. 7 shows a side-view schematic illustration of one such case, where system 300b comprises device 100b, and device 100b comprises surface portion 132b of coupling 130, in accordance with certain embodiments. FIG. 7 shows a side-view of surface portion 132b, where surface portion 132b has a spherical or pseudo-spherical shape, according to certain embodiments. In some cases in which the concavity is concave along two axes, the device comprises multiple couplings proximate to the same end of the device configured to apply a force to the electrochemical device. For example, FIG. 7 which is a side-view of system 300b, depicts device 100b comprising both coupling 130 and coupling 135, each of which is proximate to the same end of device 100b.

One non-limiting way in which a contour of a first object and a contour of a second object may interface is by having each contour have a relatively similar radius of curvature. Having a relatively similar radius of curvature for two interfacing contours may allow the contours to fit together effectively and for smooth relative rotation to occur between the contours. In some embodiments, the convexity of the contour of the surface portion of the coupling has a radius of curvature that is relatively similar to a radius of curvature of the concavity of the contour of the surface opposite the solid surface of the first solid article. For example, in some embodiments, the convexity of the contour of the surface portion of the coupling has a radius of curvature that is within 20%, within 10%, within 5%, within 1%, or less of the radius of curvature of the concavity of the contour of the surface opposite the solid surface of the first solid article.

In some embodiments, the coupling comprises a flat interface between the surface portion and the fastener. For example, referring to FIG. 6, which shows a schematic side-view of the coupling 130, coupling 130 comprises flat interface 136 between surface portion 132a and fastener 134. Having a flat interface between the surface portion of the coupling and the fastener may, in some cases, result in a force applied to the surface portion of the coupling being effectively distributed in a direction normal to the side of the electrochemical device. In some cases, the flat interface between the surface portion of the coupling and the fastener results in the surface portion and the fastener experiencing a relatively low torque during the application of a force to the electrochemical device via the coupling, which, in certain cases, results in improved performance of the device (e.g., by maintaining tension in the fastener, by causing the electrochemical device to experience a desired pressure distribution, etc.). One non-limiting way in which a force may be applied via the coupling is by tightening a nut that is interfacing with the fastener and the surface portion of the coupling (e.g., by tightening the nut around a portion of the fastener distal to the first solid article with respect to the surface portion of the coupling). In some such cases, tightening the nut such that the nut applies a force to the flat interface between surface portion of the coupling and the fastener results in an effective propagation of force in a direction normal to the side of the electrochemical device (e.g., with a relatively low torque or no torque applied to the coupling).

It should be understood that while FIGS. 2, 3A, 3B, 4A, 4B, 6, 7, and 8 depict devices containing couplings comprising surface portions and rods in accordance with certain embodiments, any of the techniques for applying the force via the solid surfaces described above (e.g., via a spring mechanism or via a wedge) may be used in addition to or as an alternative to the couplings described herein.

In some embodiments, the electrochemical device of the systems and methods described herein is cycled during the application of the force. Cycling the electrochemical device (e.g., electrochemical cell such as a battery) may comprise a charging event (e.g., charging with an external power source or charger by applying a voltage to electrochemical cells of the electrochemical device) and a discharging event (e.g., an electrochemical reaction between anode active material and cathode active material that generates electricity). In certain cases, cycling the electrochemical device while applying a force to the side of the electrochemical device according to the embodiments described herein results in improved performance of the electrochemical device relative to the performance of an otherwise identical electrochemical device to which a force is applied but not according to the embodiments described herein.

As mentioned above, one way in which the electrochemical device may show improved performance (e.g., during cycling) is by having a desirable utilization distribution. For example, in some cases, when the electrochemical device is cycled, there is a uniform distribution with respect to the utilization of electrode active material of at least one of the electrodes. For example, in some embodiments, there is a uniform distribution of the utilization of anode active material (e.g., lithium) during cycling of the electrochemical device that is caused at least in part, by the use of the methods, systems, and devices described herein.

In some embodiments, the device configured to apply a force to the side of the electrochemical device (e.g., via a solid surface) is selected such that the electrochemical device experiences a relatively uniform utilization of electrode active material in the electrochemical device during cycling. Some embodiments comprise applying a force to an electrochemical device via a solid surface, wherein the solid surface is shaped such that the force applied to the electrochemical cell causes a more uniform utilization of electrode active material in the electrochemical device during cycling relative to the utilization of the electrode active material that would be achieved using a flat solid surface but under otherwise identical conditions. As one non-limiting example, referring to FIGS. 1A-1B, applying force 50 to side 205 of electrochemical device 200 via solid surface 115 of solid article 110, which is not flat in the absence of applied force 50 (as shown in FIG. 1A), causes a more uniform utilization of electrode active material (e.g., lithium metal and/or lithium metal alloy) during cycling of electrochemical device 200 relative to the utilization of the electrode active material that would be achieved using a flat solid surface instead of solid surface 115, according to certain embodiments. Differences in uniformity of utilization of electrode active material in electrochemical devices can be determined, for example, by slicing open the electrochemical device following cycling the electrochemical device and examining the utilization visually.

One non-limiting way in which the methods, systems, and devices of the present disclosure may result in a more uniform utilization of electrode active material is by causing a relatively uniform pressure distribution across the electrochemical device during the applying of the force to the side of the electrochemical device. For example, in contrast to the methods and devices described herein, in some cases where a force is applied via a solid surface that is flat in the absence of the applied force, the solid surface may deform due to the application of the force, such that the electrochemical device experiences a greater pressure in regions proximate to the ends of the electrochemical device than in the center. In certain cases, such an uneven pressure distribution may result in a non-uniform utilization of electrode active material during cycling of the electrochemical device, which in some cases may reduce the durability of the electrochemical device.

It be should be understood that applying a force to the side of the electrochemical device via the solid surfaces described herein (e.g., solid surface 115) need not necessarily result in a relatively uniform pressure distribution in order for a relatively uniform distribution of utilization of electrode active material to be achieved. For example, in some cases, an electrochemical device may have a higher current density in certain regions during cycling (e.g., regions proximate to an electrode terminal), such that in the absence of the applied force, an uneven utilization of electrode active material would occur (with a greater utilization occurring near the terminals). In certain cases, the shape of the solid surface via which the force is applied is selected to compensate, at least in part, for such differences in current density that may occur in the absence of the applied force. For example, in some cases, both the anode and cathode terminals of an electrochemical device may be located proximate to the same end of the electrochemical device. In some such cases, the solid surface may be shaped such that the solid surface curves or slopes away from only that end of the electrochemical device in the absence of the applied force, such that when the force is applied to the side of the electrochemical device via that solid surface, the solid surface deforms in such a way that an increase in current density upon experiencing the applied force (and resulting pressure) is less near the terminals than in regions farther away from the terminals. In some such cases, a relatively uniform current density distribution and consequently a relatively uniform utilization of electrode active material (e.g., lithium metal) during cycling may result.

The systems and devices described herein may be fabricated and assembled using any of a variety of conventional techniques. For example, the couplings and the solid surface (and optionally a solid article comprising that solid surface) via which a force is applied to an electrochemical device may be shaped via machining, milling, molding, additive manufacturing (e.g., 3D printing), or any other suitable technique. In some cases, components such as fasteners can be purchased commercially. As mentioned above, in some embodiments a distal solid article is adjacent to a side of the solid article opposite the solid surface. The solid article and the distal solid article may be fabricated independently of each other. For example, the solid article comprising the solid surface may be fabricated via a 3D printing process (e.g., to create a contoured piece comprising a polymeric material or a composite material (e.g., a carbon-fiber reinforced material)), while the distal solid article (e.g., a solid plate) is obtained via machining or even purchased from a commercial vendor.

FIGS. 9A-9E are computer-generated illustrations of an exemplary system comprising an electrochemical device (a cell) and a device configured to apply a force to the electrochemical device, according to certain embodiments. FIG. 9A shows an exploded three dimensional illustration of one such non-limiting system, comprising a pressure device comprising two aluminum plates and the following components between the two aluminum plates, in order: a first foam sheet, an electrochemical cell, a second foam sheet, and an optional pressure sensor (Tekscan sensor). In the absence of an applied force, each of the two aluminum plates has a surface that is convex with respect to the electrochemical cell between the two aluminum plates, according to some embodiments. The system in FIG. 9A includes couplings that couple the two aluminum plates, with each coupling comprising a compression rod as a surface portion and a fastener with a shim and nuts, according to certain embodiments.

Figure 9B:
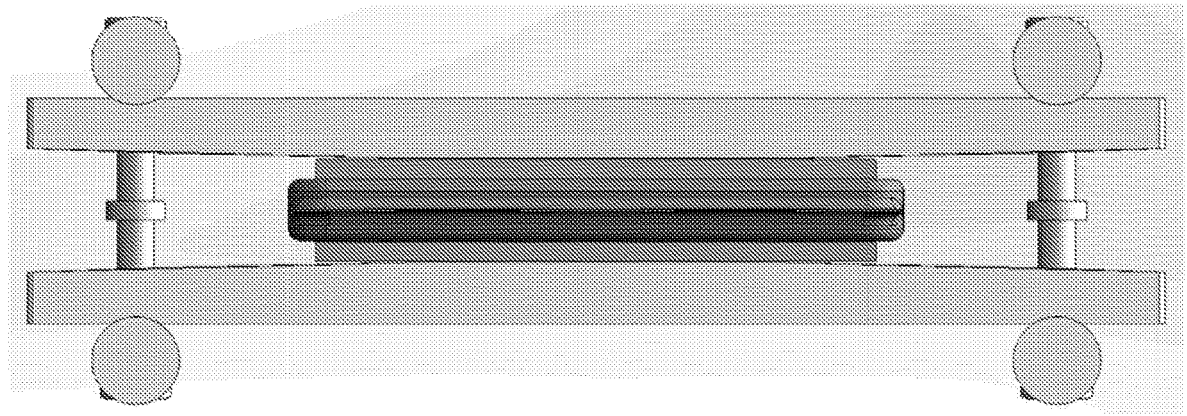
FIG. 9B shows a side view illustration of an exemplary system comprising an electrochemical device and a device for applying a force to the electrochemical device, in the absence of an applied force, according to certain embodiments.
Figure 9C:
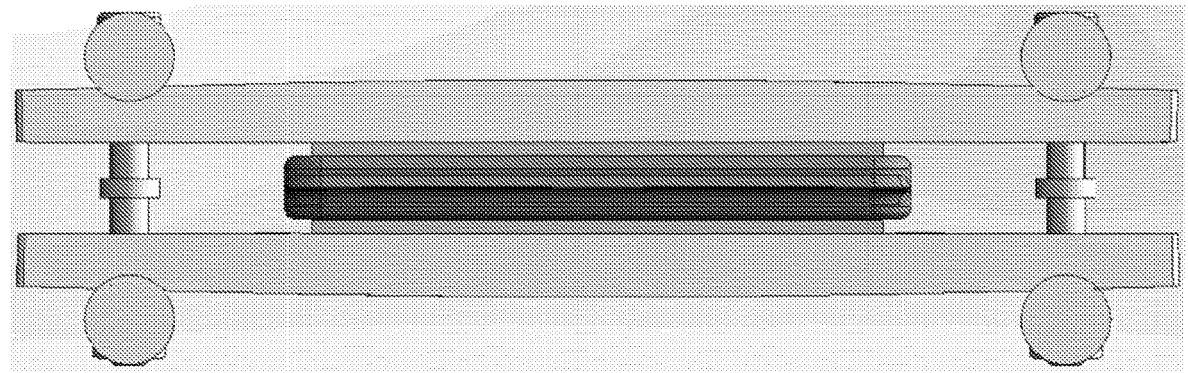
FIG. 9C shows a side view of an illustration of an exemplary system comprising an electrochemical device and a device for applying a force to the electrochemical device, with a force being applied, according to certain embodiments.
Figure 9D:
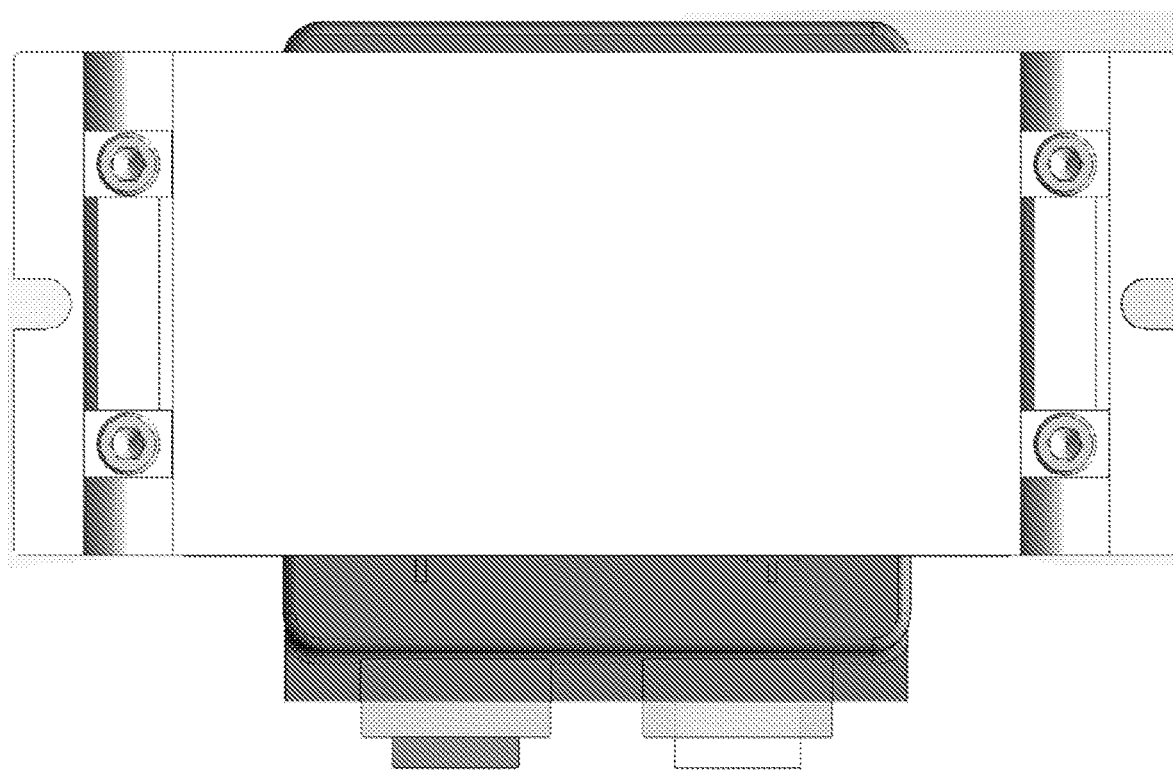
FIG. 9D shows a top-down view illustration of an exemplary system comprising an electrochemical device and a device for applying a force to the electrochemical device, according to certain embodiments.
Figure 9E:
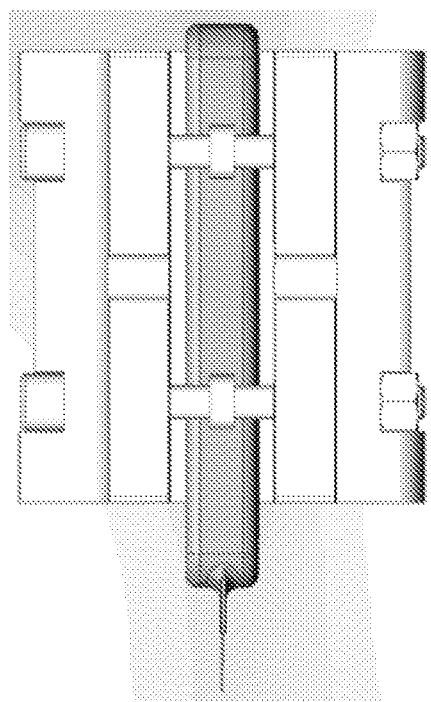
FIG. 9E shows a side view illustration of an exemplary system comprising an electrochemical device and a device for applying a force to the electrochemical device, according to certain embodiments.

FIG. 9B shows a side-view illustration of an assembled version of the system shown in FIG. 9A in the absence of an applied pressure, according to certain embodiments. As can be seen in FIG. 9B, each of the two aluminum plates has a surface that is convex with respect to the electrochemical cell in the absence of the applied force, according to certain embodiments. FIG. 9C shows a side-view illustration of the same system as in FIG. 9B, but with the couplings tightened such that a magnitude of force is applied that is sufficient to deform the aluminum plates such that the convex surfaces shown in FIG. 9B become less convex, according to certain embodiments. As mentioned above, in some cases, such a deformation results in a desired pressure distribution experienced by the electrochemical device. FIG. 9D and FIG. 9E show a top-down view and another side-view of the system, respectively, according to some embodiments.

A variety of anode active materials are suitable for use with the anodes of the electrochemical device (e.g., comprising an electrochemical cell) described herein, according to certain embodiments. In some embodiments, the anode active material comprises lithium (e.g., lithium metal), such as lithium foil, lithium deposited onto a conductive substrate or onto a non-conductive substrate (e.g., a release layer), and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin. In some embodiments, the anode active material comprises lithium (e.g., lithium metal and/or a lithium metal alloy) during at least a portion of or during all of a charging and/or discharging process of the electrochemical device.

In some embodiments, the anode active material contains at least 50 wt % lithium. In some cases, the anode active material contains at least 75 wt %, at least 90 wt %, at least 95 wt %, or at least 99 wt % lithium.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In certain cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In certain embodiments, the anode active material comprises silicon, lithium, and/or any alloys of combinations thereof. In certain embodiments, the anode active material comprises lithium titanate ($Li_4Ti_5O_{12}$, also referred to as "LTO"), tin-cobalt oxide, or any combinations thereof.

A variety of cathode active materials are suitable for use with cathodes of the electrochemical cells described herein, according to certain embodiments. In some embodiments, the cathode active material comprises a lithium intercalation compound (e.g., a compound that is capable of reversibly inserting lithium ions at lattice sites and/or interstitial sites). In certain cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}$ $(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xMn_{2-x}O_4$, also referred to as "LMNO"). A non-limiting example of a suitable LMNO compound is $LiNi_{0.5}Mn_{1.5}O_4$. In certain cases, the electroactive material of the second electrode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In some embodiments, the cathode active material may be modified by a surface coating comprising an oxide. Non-limiting examples of surface oxide coating materials include: MgO, $Al_2O_3$, $SiO_2$, $TiO_2$, $ZnO_2$, $SnO_2$, and $ZrO_2$. In some embodiments, such coatings may prevent direct contact between the cathode active material and the electrolyte, thereby suppressing side reactions.

In certain embodiments, the cathode active material comprises sulfur. In some embodiments, the cathode active material comprises electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least 40 wt % sulfur. In some cases, the electroactive sulfur-containing material comprises at least 50 wt %, at least 75 wt %, or at least 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130, each of which is incorporated herein by reference in its entirety for all purposes. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al., each of which is incorporated herein by reference in its entirety for all purposes. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al., each of which is incorporated herein by reference in its entirety for all purposes.

One or more electrodes may further comprise additional additives, such as conductive additives, binders, etc., as described in U.S. Pat. No. 9,034,421 to Mikhaylik et al.; and U.S. Patent Application Publication No. 2013/0316072, each of which is incorporated herein by reference in its entirety for all purposes.

In some embodiments, the electrochemical device may further comprise a separator between two electrode portions (e.g., an anode portion and a cathode portion). The separator may be a solid non-conductive or insulative material which separates or insulates the anode and the cathode from each other preventing short circuiting, and which permits the transport of ions between the anode and the cathode. In some embodiments, the porous separator may be permeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

As mentioned above, in some embodiments described herein, a force, or forces, is applied to portions of an electrochemical device. Electrochemical devices (e.g., electrochemical cells) in which anisotropic forces are applied and methods for applying such forces are described, for example, in U.S. Pat. No. 9,105,938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

In the embodiments described herein, electrochemical devices (e.g., rechargeable batteries) may undergo a charge/discharge cycle involving deposition of metal (e.g., lithium metal or other active material) on a surface of the anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical device has been found, in accordance with certain embodiments described herein, to reduce such behavior and to improve the cycling lifetime and/or performance of the cell.

In some embodiments, an anisotropic force with a component normal to an active surface of the anode is applied during at least one period of time during charge and/or discharge of the electrochemical device. In some embodiments, the force may be applied continuously, over one period of time, or over multiple periods of time that may vary in duration and/or frequency. The anisotropic force may be applied, in some cases, at one or more pre-determined locations, optionally distributed over an active surface of the anode. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction substantially parallel to the first axis than the force applied substantially parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the electrochemical device, but the magnitude of the forces in out-of-plane directions is substantially unequal to the magnitudes of the in-plane forces.

The magnitude of the applied force is, in some embodiments, large enough to enhance the performance of the electrochemical device. An anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least 8 kgf/cm$^2$, at least 9 kgf/cm$^2$, at least 10 kgf/cm$^2$, at least 20 kgf/cm$^2$, at least 30 kgf/cm$^2$, at least 40 kgf/cm$^2$, or at least 50 kgf/cm$^2$. This is because the yield stress of lithium is around 7-8 kgf/cm$^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least 8 kgf/cm$^2$, at least 9 kgf/cm$^2$, at least 10 kgf/cm$^2$, at least 20 kgf/cm$^2$, at least 30 kgf/cm$^2$, at least 40 kgf/cm$^2$, or at least 50 kgf/cm$^2$ of externally-applied pressure, the lithium surface may become smoother with cycling when the pressing surface is smooth. As described herein, the pressing surface may be modified by choosing the appropriate material(s) positioned between the anode and the cathode.

In some cases, one or more forces applied to the cell have a component that is not normal to an active surface of an anode. For example, in FIG. 2, force 384 is not normal to active surface 231 of electrode 230. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least 5%, at least 10%, at least 20%, at least 35%, at least 50%, at least 75%, at least 90%, at least 95%, at least 99%, or at least 99.9% larger than any sum of components in a direction that is parallel to the anode active surface.

In some cases, the electrochemical device may be pre-compressed before it is inserted into the device configured to apply a force to the side of the electrochemical device, and, upon being inserted to the device, it may expand to produce a net force on the electrochemical device (as it contacts the solid surface of the device). Such an arrangement may be advantageous, for example, if the electrochemical device is capable of withstanding relatively high variations in pressure. In such embodiments, the device configured to apply the force may have a relatively high strength (e.g., at least 100 MPa, at least 200 MPa, at least 500 MPa, or at least 1 GPa). In addition, device may have a relatively high elastic modulus (e.g., at least 10 GPa, at least 25 GPa, at least 50 GPa, or at least 100 GPa). As mentioned above, the device or components thereof (e.g., solid articles, couplings, etc.) may comprise, for example, aluminum, titanium, or any other suitable material.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "directly adjacent", "immediately adjacent", "in direct contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

U.S. Provisional Application No. 62/864,831, filed Jun. 21, 2019, and entitled "Methods, Systems, and Devices for Applying Forces to Electrochemical Devices," is incorporated herein by reference in its entirety for all purposes.

The following examples are intended to illustrate certain embodiments of the present invention, but do not exemplify the full scope of the invention.

Example 1

This example describes the variation in pressure experienced by an electrochemical cell upon the application of a force using a pressure device in accordance with certain embodiments, as compared to a conventional device pressure device. In this example, two experiments were performed in which an electrochemical cell was placed between two plates of a pressure device. In the first experiment, an electrochemical cell was placed between two aluminum plates of Comparative Device 1. The surfaces of the two plates of comparative Device 1 facing the electrochemical cell were both flat with respect to the electrochemical cell. A pressure mapping sensor was placed between the electrochemical cell and one of the flat plates. The two plates of Comparative Device 1 were clamped together until a desired total pressure was applied to the electrochemical cell as measured with the pressure mapping sensor. The range of pressure measured over the face of the electrochemical cell was recorded.

In the second experiment, an electrochemical cell was placed between two contoured aluminum plates of inventive Device 1. Device 1 had the same design as that shown in FIGS. 9A-9E. The surfaces of the two plates of Device 1 facing the electrochemical cell were both convex with respect to the electrochemical cell prior in the absence of the applied force. A pressure mapping sensor was placed between the electrochemical cell and one of the contoured plates. The two contoured plates of Device 1 were clamped together with couplings comprising cylindrical compression rods and fasteners as illustrated in FIGS. 9A-9E until a desired total pressure was applied to the electrochemical cell as measured with the pressure mapping sensor. The range of pressure measured over the face of the electrochemical cell was recorded. Table 1 shows the recorded pressure measurements from the experiments involving Comparative Device 1 and Device 1.

TABLE 1

| Experiment | Total Pressure (kg/cm$^2$) | Minimum Recorded Pressure (kg/cm$^2$) | Maximum Recorded Pressure (kg/cm$^2$) |
|---|---|---|---|
| Comparative Device 1 | 12.5 | 9.1 | 15.9 |
| Device 1 | 12.6 | 11.3 | 13.3 |

The results of Table 1 show that the use of the inventive pressure device comprising the contoured plates to apply pressure to the electrochemical device resulted in a smaller variation in pressure experienced by the electrochemical device across the face of the electrochemical cell as compared to the variation in pressure experienced when the flat plates of Comparative Device 1 were used. Though similar total pressures were experienced in both experiments (12.5-12.6 kg/cm$^2$), the difference between the minimum and maximum pressures recorded with Comparative Device 1 (6.8 kg/cm$^2$) was more than three times greater than the difference between the minimum and maximum pressures recorded with the inventive Device 1 (2.0 kg/cm$^2$).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
applying a force to a side of an electrochemical device via a solid surface that is part of a solid article, wherein at least a portion of the solid surface is convex with respect to the side of the electrochemical device in the absence of an applied force, and wherein the applying causes the solid surface and an exterior surface opposite the solid surface to deform such that the solid surface becomes less convex and the exterior surface becomes concave or more concave with respect to the side of the electrochemical device.

2. The method of claim 1, wherein the applying is performed via a coupling comprising a surface portion in contact with the exterior surface, and the deforming causes relative rotational motion between a contour of the exterior surface and a contour of the surface portion of the coupling that is coupled to the contour of the exterior surface.

3. The method of claim 1, wherein the applying is performed via a coupling, the coupling comprising:
a surface portion in contact with the exterior surface; and
a fastener interfacing with the surface portion of the coupling;
wherein a contour of the exterior surface interfaces with a contour of the surface portion of the coupling such that, when the force is applied, the fastener experiences a bending moment that is smaller than the bending moment that the fastener would experience if the exterior surface and the surface portion of the coupling were flat but under otherwise identical conditions.

4. The method of claim 1, wherein the solid surface is shaped such that the force applied to the electrochemical device causes a more uniform utilization of electrode active material within the electrochemical device during cycling relative to the utilization of the electrode active material that would be achieved using a flat solid surface but under otherwise identical conditions.

5. The method of claim 1, wherein the applying causes a flatness of the solid surface to increase relative to a flatness of the solid surface in the absence of the applied force.

6. The method of claim 5, wherein a flatness tolerance of the solid surface decreases by factor of at least 1.5 relative to the flatness tolerance of the solid surface in the absence of the applied force.

7. The method of claim 5, wherein a flatness tolerance of the solid surface decreases by a factor of up to 10 relative to the flatness tolerance of the solid surface in the absence of the applied force.

8. The method of claim 1, wherein a component of the applied force normal to an active surface of at least one electrode of the electrochemical device defines a pressure of at least 49 Newtons per square centimeter.

9. The method of claim 1, wherein a component of the applied force normal to an active surface of at least one electrode of the electrochemical device defines a pressure of less than or equal to 250 Newtons per square centimeter.

10. The method of claim 1, wherein the side of the electrochemical device is a first side, the solid article is a first solid article, the electrochemical device comprises a second side, and at least a portion of a second solid surface of a second solid article proximate the second side of the electrochemical device has a convexity that is less than the convexity of the second solid surface of the second solid article when the applied force is removed.

11. The method of claim 10, wherein the second solid article is or comprises a second solid plate.

12. The method of claim 1, wherein the electrochemical device comprises lithium metal and/or a lithium metal alloy as an anode active material.

13. The method of claim 1, further comprising charging and/or discharging the electrochemical device during the step of applying the force.

14. The method of claim 1, wherein the solid article is or comprises a first solid plate.

15. The method of claim 1, wherein the exterior surface opposite the solid surface is part of the solid article.

16. The method of claim 1, wherein a distal solid article is adjacent to a side of the solid article opposite the solid surface.

17. The method of claim 16, wherein the exterior surface is part of the distal solid article.

18. The method of claim 16, wherein the solid article and/or the distal solid article comprises a metal, metal alloy, composite material, or a combination thereof.

19. The method of claim 16, wherein the solid article comprises a polymeric material.

20. The method of claim 16, wherein the distal solid article comprises a solid plate.

21. The method of claim 16, wherein the solid surface has a geometric area smaller than a maximum lateral geometric area of the distal solid article.

22. The method of claim 1, wherein the applying causes the exterior surface to deform such that the exterior surface becomes concave with respect to the side of the electrochemical device.

23. The method of claim 1, wherein the applying causes the exterior surface to deform such that the exterior surface becomes more concave with respect to the side of the electrochemical device.

* * * * *